US006537410B2

(12) United States Patent
Arnost et al.

(10) Patent No.: US 6,537,410 B2
(45) Date of Patent: Mar. 25, 2003

(54) THERMAL TRANSFER RECORDING SYSTEM

(75) Inventors: Michael J. Arnost, North Andover, MA (US); Alain Bouchard, Boston, MA (US); Yongqi Deng, Newton, MA (US); Edward J. Dombrowski, Bellingham, MA (US); Russell A. Gaudiana, Merrimack, NH (US); Serajul Haque, Randolph, MA (US); Fariza B. Hasan, Waltham, MA (US); John L. Marshall, Lexington, MA (US); Stephen J. Telfer, Arlington, MA (US); William T. Vetterling, Lexington, MA (US); Michael S. Viola, Burlington, MA (US)

(73) Assignee: Polaroid Corporation, Waltham, MA (US)

( * ) Notice: Subject to any disclaimer, the term of this patent is extended or adjusted under 35 U.S.C. 154(b) by 121 days.

(21) Appl. No.: 09/745,700

(22) Filed: Dec. 21, 2000

(65) Prior Publication Data

US 2001/0043239 A1 Nov. 22, 2001

Related U.S. Application Data

(60) Provisional application No. 60/179,562, filed on Feb. 1, 2000.

(51) Int. Cl.⁷ ................................. B41M 5/30
(52) U.S. Cl. ..................... 156/235; 106/31.29; 428/195
(58) Field of Search ................................. 428/195, 484, 428/488.1, 913, 914; 156/235; 106/31.13, 31.27, 31.29

(56) References Cited

U.S. PATENT DOCUMENTS

| 3,978,247 A | 8/1976 | Braudy et al. ............. 427/43 |
| 4,499,165 A | 2/1985 | Molaire ..................... 430/17 |
| 4,503,095 A | 3/1985 | Seto et al. ................. 427/265 |
| 4,585,688 A | 4/1986 | Nakamura et al. .......... 428/200 |
| 4,623,580 A | 11/1986 | Koshizuka et al. ......... 428/216 |
| 4,626,361 A | 12/1986 | Molaire ..................... 252/1 |
| 4,670,307 A | 6/1987 | Onishi et al. ............... 427/261 |
| 4,732,815 A | 3/1988 | Mizobuchi et al. ......... 428/484 |
| 5,153,680 A | 10/1992 | Naito et al. ................. 357/8 |
| 5,308,736 A | 5/1994 | Defieuw et al. ............. 430/200 |
| 5,328,746 A | 7/1994 | Okuyama et al. ........... 428/195 |
| 5,521,626 A | 5/1996 | Tanaka et al. ............... 347/183 |
| 5,592,208 A | 1/1997 | Shinozaki et al. ........... 347/171 |
| 5,891,602 A | 4/1999 | Neumann ................... 430/200 |
| 5,897,254 A | 4/1999 | Tanaka et al. ............. 400/120.07 |
| 6,133,129 A | 10/2000 | Xiang et al. ................ 438/585 |

FOREIGN PATENT DOCUMENTS

| EP | 649754 | 4/1995 |
| EP | 696518 | 2/1996 |
| JP | 03126589 | 5/1991 |

*Primary Examiner*—Bruce H. Hess

(57) ABSTRACT

There is described a thermal recording system which utilizes a donor element comprising a substrate and a thermal transfer material layer having a dye-containing phase which is amorphous and wherein the dye or dyes present in the amorphous phase form a continuous film. Imagewise heating of the medium transfers portions of the transfer layer to a receiver sheet, thus forming an image. The transfer layer may also include a non-dye phase comprising a thermal solvent. During the heating of the donor element, the crystalline thermal solvent melts and dissolves or liquefies at least a portion of the dye-containing phase, thereby lowering the temperature at which transfer of the transfer layer occurs.

55 Claims, 2 Drawing Sheets

THERMAL TRANSFER RECORDING SYSTEM

REFERENCE TO RELATED APPLICATIONS

This application claims the benefit under 35 USC 119(e)(1) of prior provisional patent application Serial No. 60/179562, filed Feb. 1, 2000.

BACKGROUND OF INVENTION

This invention relates to a thermal transfer recording system. More specifically, this invention relates to a thermal transfer recording system which utilizes a donor sheet in which the transfer layer contains an amorphous, or non-crystalline, dye phase.

A number of different printing systems utilize thermal transfer of a dye from a donor sheet to a receiving sheet. A wide variety of specific mechanisms for thermal transfer have been used, but as described in "A New Thermal Transfer Ink Sheet for Continuous-Tone Full Color Printer", by M. Kutami et al., *J. Imaging Sci.*, 1990, 16, 70–74, all fall into two broad categories. In the first of these, dyes thermally diffuse from a polymeric binder on the donor sheet into a second polymeric layer on the receiving sheet, in a process called "dye diffusion thermal transfer" (or D2T2; this process is also sometimes called "dye sublimation transfer"). In this type, only the dye is transferred, not the binder in which it is dispersed on the donor sheet. In the second category, commonly referred to as thermal mass transfer, or TMT, both a dye and a vehicle are transferred together from the donor sheet to the receiving sheet.

Thermal mass transfer methods may be further subdivided into those involving differential adhesion, in which a heated plug of material from the donor sheet adheres to the surface of the receiving sheet, and those involving flow penetration, in which the colorant layer on the donor sheet melts and is transferred into pores on the receiving sheet. Thermal mass transfer generally requires significantly less energy than dye diffusion thermal transfer, and, among the various thermal mass transfer processes, flow penetration may require somewhat less energy than differential adhesion. Thus, thermal mass transfer with flow penetration is the typically preferred technique for use in situations in which energy consumption must be kept low, for example, in battery-powered printing devices.

Prior art methods for thermal mass transfer with flow penetration have a number of disadvantages. Because the layers transferred tend to be relatively thick (typically in the range of 1.5–2.5 $\mu$m), the pore diameter in the receiving sheet is typically required to be in the range of about 1 to 10 $\mu$m, as described for example in U.S. Pat. Nos. 5,521,626 and 5,897,254. Consequently, the receiving sheet tends to scatter visible light and have a matte appearance. If it is desired to use such a method to produce a glossy image (for example, for reproduction of a photograph, where most consumers expect a glossy image), a fourth clear panel (in addition to the three primary color images) typically must be thermally transferred over the entire area of the image. Transfer of the fourth panel increases both the energy required and the time required to make a print, since four passes rather than three are required to form a fill color image. Further, if a microporous receiving sheet is not used, the durability of the image can be poor.

Such requirements for the prior art methods for thermal transfer into porous receiver materials could be alleviated by a method for transferring a molten imaging ink into receiver sheet pores substantially smaller in diameter than wavelengths of visible light. Glossy receiving sheets having such pore sizes are readily available commercially and are indeed commonly used for ink jet printing.

As the state of the art advances and efforts are made to provide new thermal transfer recording systems which can meet new performance requirements and to reduce or eliminate some of the aforementioned undesirable characteristics or requirements of the known systems it would be advantageous to have a thermal transfer recording system which can utilize relatively thin donor layers and which can utilize receiver sheets which have a relatively smooth, glossy surface. It is therefore an object of this invention to provide a novel thermal transfer recording system. It is another object of the invention to provide a thermal transfer donor material which has a relatively thin layer of transfer material. A further object of the invention is to provide a thermal transfer recording method which can utilize a relatively smooth, glossy receiver material. Still another object of the invention is to provide a donor sheet transfer material coating capable of being transferred into pores having average diameters less than about 0.2 $\mu$m.

SUMMARY OF THE INVENTION

These and other objects and advantages are accomplished in accordance with the invention by providing a novel thermal transfer recording system wherein a donor element comprising a substrate bearing a layer of a thermal transfer material is heated to transfer portions of the transfer material imagewise to a receiver element. According to the invention the layer of thermal transfer material comprises a dye-containing, amorphous, (non-crystalline) phase which includes at least one dye, wherein the dye or dyes present in the amorphous phase form a continuous film. The thermal transfer material layer is not appreciably tacky at room temperature.

Optionally, and preferably, the thermal transfer material layer includes at least one thermal solvent. As will be described in detail below herein, at least a part of the thermal solvent material is incorporated into the dye-containing phase and another part of the thermal solvent material forms a second crystalline phase separate from the dye-containing phase. The crystalline thermal solvent in the thermal transfer material layer melts and dissolves or liquefies the dye-containing phase thereby permitting dissolution or liquefaction of the dye-containing phase to occur at a temperature lower than that at which such dissolution or liquefaction occurs in the absence of the crystalline thermal solvent.

There is also provided according to the invention a novel donor element for use in thermal transfer recording, the donor element comprising a substrate, or carrier layer, and a thermal transfer material layer as described above.

This invention also provides a meltable composition comprising a mixture of a first dye-containing phase as described above and a second phase comprising at least one crystalline thermal solvent.

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DESCRIPTION OF THE PREFERRED EMBODIMENTS

Figure 1:
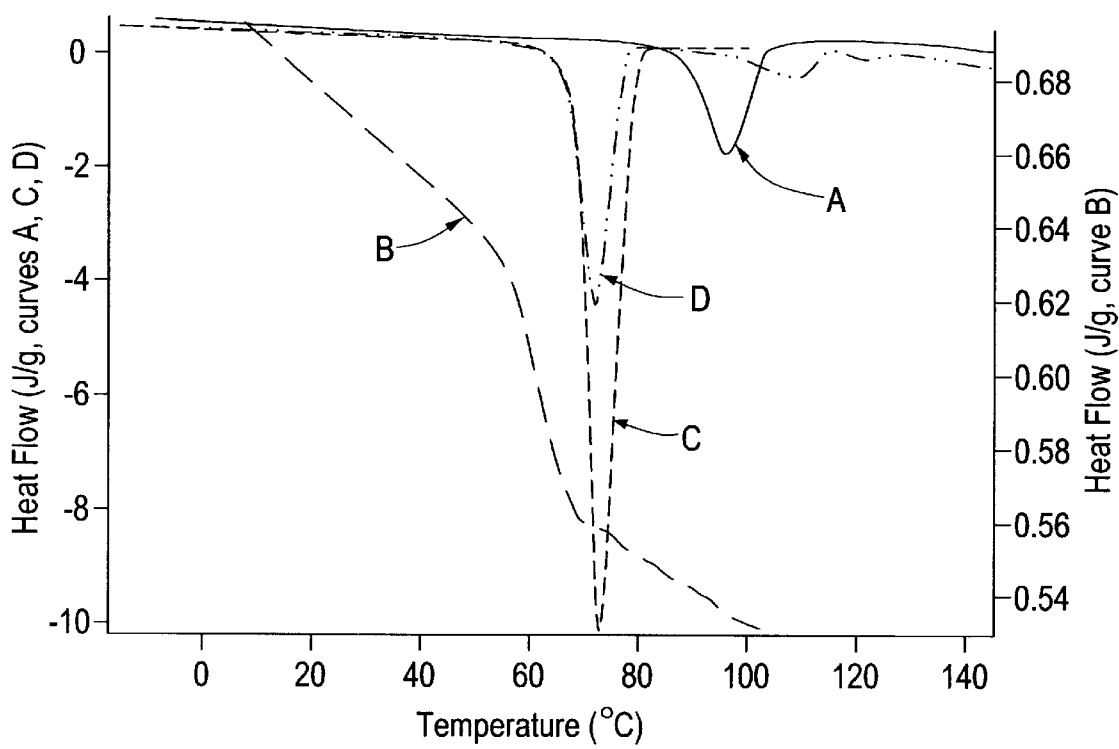
FIG. 1 is a graphical illustration of heat flow as a function of temperature for: a) a yellow dye in crystalline form; b) the same yellow dye in amorphous form; c) a thermal solvent in crystalline form; and d) a 1:1 (by weight) mixture of the yellow dye and the thermal solvent.

As previously stated, the present invention provides a method for thermal transfer recording, and donor sheets and fusible compositions for use therein, which are based upon thermal transfer material layers comprising an amorphous, or non-crystalline, dye-containing phase. The thermal transfer material layer according to the invention is characterized in that it is a solid transparent or translucent film which does not undergo any detectable flow at room temperature and the film is formed by the dye(s) in the amorphous phase.

The dyes which are utilized in accordance with the invention can be those which form solids which are themselves amorphous, that is to say solids which lack the long-range ordered structure characteristic of crystalline solids. Those skilled in materials science will be familiar with various methods for distinguishing amorphous from crystalline solids; for example, amorphous solids do not give the strong powder X-ray diffraction lines exhibited by crystalline solids, and also lack the strong electron diffraction characteristics of crystalline solids.

Amorphous solids formed from low molecular weight organic compounds have been described in the art. As described, for example, in "Organic Monomeric Glasses: A Novel Class of Materials" by Michel F. Molaire and Roger W. Johnson, *J. Polymer Sci.* 1989, 2569–2592, "Molecular Design for Nonpolymeric Organic Dye Glasses with Thermal Stability: Relations between Thermodynamic Parameters and Amorphous Properties", by Katsuyki Naito and Akira Miura, *J. Phys. Chem.* 1993, 97, 6240–6248, and "Glass Formation from Low Molecular Weight Organic Melts", by Seong-Jin Kim and T. E. Karis, *J. Mater. Res.* 1995, 10, 2128–2136, such amorphous solids can form transparent, thermally stable, non-tacky films which have a glassy appearance. Such films may be stabilized with respect to the corresponding crystalline phase either thermodynamically (for example, by using in the glass phase a mixture of two or more chemically similar molecules) or kinetically, by means of a network of weak bonds (for example, hydrogen bonds) between the individual molecules.

Any type of weak non-covalent intermolecular bonding can be used for stabilization of amorphous solid dye films, for example coulombic interactions between ionic compounds, hydrogen bonds and Van der Waals interactions. In a preferred embodiment the amorphous, dye-containing phase may comprise a dye capable of forming hydrogen bonds with its neighbors. Numerous examples of such compounds are known; for example, the hydrogen bond-forming dye may be an azo or anthraquinone dye bearing at least one di-hydroxybenzene ring (the term "di-hydroxybenzene ring" being used herein to include tri-, tetra- and penta-hydroxy substituted rings). Preferred examples of such hydrogen bond-forming dyes include Dyes I–X shown below. Certain ionic dyes, several of which are available commercially, have sufficient solubility in coating solvents (for example, n-butanol) to be cast as thin films of amorphous solid dyes with sufficient cohesive and adhesive strength that they are not removed from a donor sheet substrate by adhesive tape; these films also have glass transition temperatures substantially above room temperature so that they are not tacky at room temperature. Examples of such ionic dyes are Dyes XI–XXV shown below. It is not necessary for the ionic dyes to have two separate ions; such dyes can be zwitterions. Examples of other suitable dyes include Solvent Yellow 13, Solvent Yellow 19, Solvent Yellow 36, Solvent Yellow 47, Solvent Yellow 88, Solvent Yellow 143, Basic Yellow 27, Solvent Red 35, Solvent Red 49, Solvent Red 52, Solvent Red 91, Solvent Red 122, Solvent Red 125, Solvent Red 127, Basic Red 1, Basic Violet 10, Solvent Blue 5, Solvent Blue 25. Solvent Blue 35, Solvent Blue 38, Solvent Blue 44, Solvent Blue 45, Solvent Blue 67, Solvent Blue 70, Basic Blue 1, Basic Blue 2, and Basic Blue 33. These dyes are well known and are described in the literature, for example, in the Color Index. Other examples of such dyes are Kayaset Yellow K-CL, Kayaset Blue K-FL and Kayaset Black K-R, all available from Nippon Kayaku Company, Ltd., Color Chemicals Div., Tokyo, Japan. Mixtures of these dyes can also be used to form amorphous solid films for use according to the invention. Dyes I–XXV are:

The following azo dyes:

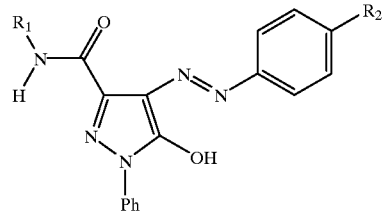

I. (yellow) R1=hex-1-yl, R2=n-dodceyl;
II. (yellow) R1=1-(4-hydroxyphenyl)eth-2-yl, R2=dodecyl;
III. (yellow) R1=2-ethylhex-1-yl, R2=-(2,4-dihydroxyphenyl)eth-2-yl;
IV. (yellow) R1=2-ethylhex-1-yl, R2=1-(2,5-dihydroxyphenyl)eth-2-yl;
V. (yellow) R1=n-heptyl, R2=1-(2,5-dihydroxyphenyl)eth-2-yl;

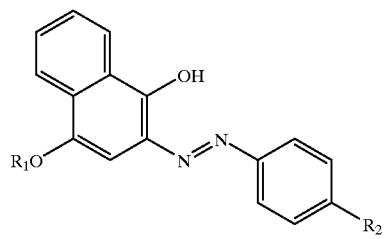

VI. (magenta) R1=prop-2-yl, R2=1-(2,4-dihydroxyphenyl)eth-2-yl;
VII. (magenta) R1=hex-1-yl, R2=1-(2,4-dihydroxyphenyl)eth-2-yl;
VIII. (magenta) R1=2-methylprop-1-yl, R2=1-(2,4-dihydroxyphenyl)eth-2-yl.

The following anthraquinone dyes:

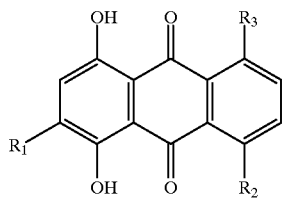

IX. (cyan) R1=hydrogen, R2=(1-hydroxybut-2-yl)amino, R3=(1-(2,5-dihydroxyphenyl)prop-2-yl)amino;

X. (cyan) R1=5-(2,5-dihydroxyphenyl)pent-1-yl, R2=R3 (pent-3-yl)amino.

The following quinoline dye:

XI. (yellow)

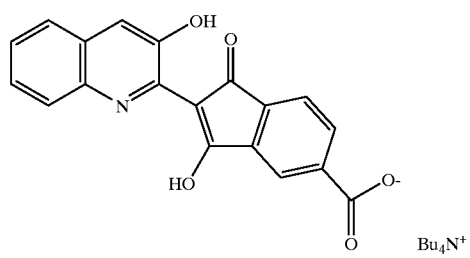

The following xanthene dyes:

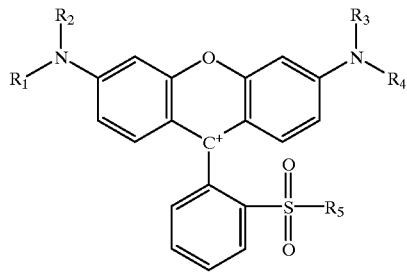

XII. (magenta) R1=R3=2-chlorophenyl, R2=R4=methyl, R5=N,N-di(n-hexyl)amino chloride;

XIII. (magenta) R1=R3=hydrogen, R2=R4=2-chloro-5-(2-ethylhex-1-yl)carboxamidophenyl, R5=O⁻;

XIV. (magenta) R1=R3=methyl, R2=R4=2-chloro-5-(2-ethylhex-1-yl)carboxamidophenyl, R5=O⁻;

XV. (magenta) R1=R3=methyl, R2=R4=2-methyl-5-(2-ethylhex-1-yl)carboxamidophenyl, R5=O⁻;

XVI. (magenta) R1=R3=hydrogen, R2=R4=2-(but-1-yl)carboxamidophenyl, R5=O⁻;

XVII. (magenta) R1=R3=ethoxycarbonylmethyl, R2=R4=4-s-butyl-phenyl, R5=O⁻;

XVIII. (magenta) R1=R3=a statistical mixture derived from equal amounts of 2-ethylphenyl, 2,3-dimethylphenyl, 2,4-dimethylphenyl and 2,5-dimethylphenyl; R2=R4=methyl; R5=O⁻;

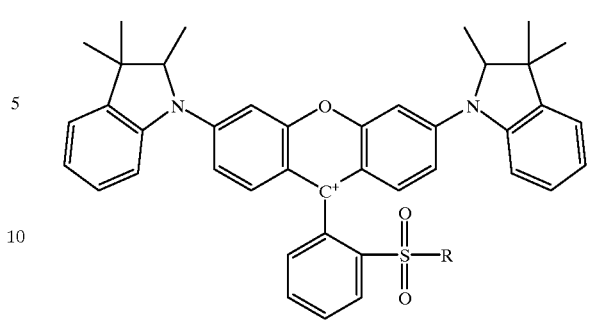

XIX. (cyan) R=N,N-di(n-hexyl)amino chloride;

XX. (cyan) R=O⁻;

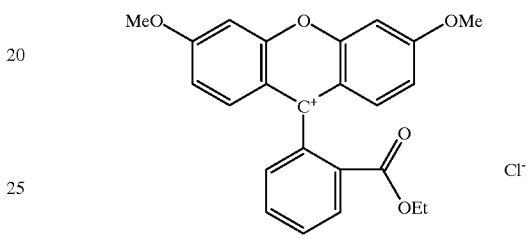

XXI. (yellow)

The following triarylmethane dyes:

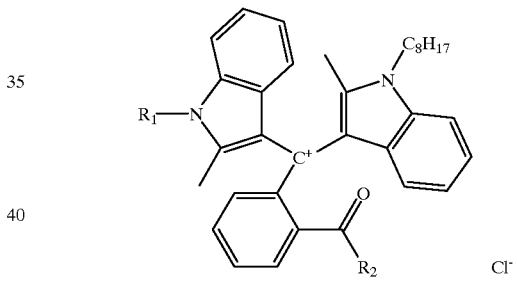

XXII. (magenta) R1=but-1-yl, R2=N,N-di(n-hexyl)amino;

XXIII. (magenta) R1=but-1-yl, R2=N-(4-((3,5-dihydroxybenzamido)methyl)piperidinyl);

XXIV. (magenta) R1=oct-1-yl, R2=N,N-diethylamino;

XXV. (magenta) R1=oct-1-yl, R2=N,N-bis(2-hydroxy-2-oxoeth-1-yl).

Those of skill in the art will recognize that the counterions of the ionic dyes may readily be changed provided that solubility of the dye and its color remain satisfactory.

The formation of an amorphous solid film from a dye according to the invention can be seen by reference to the graphical illustration in FIG. 1 which shows the behavior exhibited by a material as a function of temperature (° C.). The dye used was a yellow azo dye (IV) and the heat flow into the material was measured by differential scanning calorimetry (DSC) using a TA Instruments 2920 DSC unit operated in the Modulated DSC mode [MDSC]. Operation in the MDSC mode enables the total heat flow signal to be separated into reversible and non-reversible heat flow components; permitting the separation of sample phase transitions, such as crystal melting and Tg, from non-reversible phenomena such as volatilization, morphology reorganizations, and chemical reactions. Typically samples were run in nitrogen atmosphere at heating rates of either 2 or 4 degrees Centigrade/minute over the temperature range: −10° C. to 120° C. [thermal solvents] or −10° C. to 200° C. [dyes]. Samples were run through 2 heating cycles with quench cooling to compare samples after they have a common thermal history. To determine the effect of cooling rate on the sample morphology, samples were run through 3 consecutive heating cycles separated by a slow cool [4° C./min] and quench cool steps. Samples weights were in the range: 4–6 mg.

Curve A was obtained with the dye in powder (crystalline) form and exhibits a melting point at just below 100° C. Curve B was obtained with the same dye taken from an amorphous solid layer of the dye formed by coating a solution of the dye in n-butanol onto a glass plate, drying the coating, and scraping off the material so deposited. It can be seen that the dye in the amorphous (non-crystalline) condition exhibited a glass transition temperature (Tg) at approximately 60° C. as shown by the change observed in the heat flow into the amorphous dye. Curve C was obtained with 1,10-decanediol (TS1 shown below), a thermal solvent which can be utilized in accordance with the invention as will be described in detail below herein, and Curve D from a 1:1 mixture by weight of the thermal solvent and yellow dye formed by coating on a glass plate.

Figure 2:
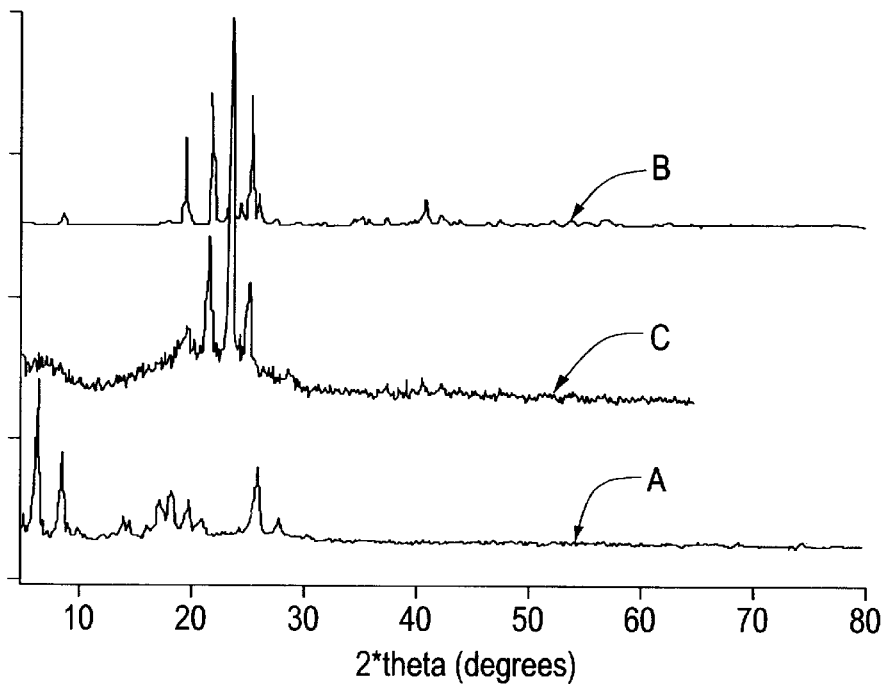
FIG. 2 is a graphical illustration of the X-ray diffraction lines exhibited by: a) a yellow dye in crystalline form; b) a thermal solvent in crystalline form; and c) a 1.1 (by weight) mixture of the yellow dye and the thermal solvent.

The X-ray diffraction lines of the materials used to obtain the data shown in FIG. 1 are illustrated in FIG. 2. These data were obtained from wide angle X-ray diffraction (WAXD) experiments conducted using a Siemens D500 fixed-anode generator (rotating specimen carrier) coupled with a diffractometer. The monochromatized X-ray beam consisting of Cu Kα with a wavelength of 0.154 nm at 40 kV and 30 mA was used for this measurement, in the 2 theta range of 2–80 degrees.

It can be seen from Curve A that the powder (crystalline) form of the dye exhibits the strong diffraction lines characteristic of crystalline solids. Curves B and C, respectively, were obtained with crystalline 1,10-decanediol and the 1:1 mixture of 1,10-decanediol and the dye formed as described by coating on a glass plate. It can be seen that the 1,10-decanediol exhibits the strong diffraction lines characteristic of a crystalline solid whereas the mixture exhibits the strong diffraction lines characteristic of the thermal solvent but not those characteristic of the crystalline dye material thus indicating that the dye is in the amorphous form.

There are several different preferred embodiments of the present invention, which may be broadly divided into two types, namely single phase embodiments and multi-phase embodiments. As the name implies, in the single phase embodiments the transfer layer material contains primarily only a single dye-containing phase, although there may be present small amounts of an additive or additives in separate phases. Such additives may be, for example, light stabilizers, ultra-violet absorbers and antioxidants. Thus, this dye-containing phase may contain essentially a dye or mixture of dyes with little if any other material. Generally, any other ingredients in the thermal transfer material layer would not necessarily be film-forming materials since the principal film-forming component of the layer is the dye itself.

The dye-containing phase can be a single compound (such as those listed above) capable of itself forming the necessary amorphous, non-crystalline phase, or a mixture of such compounds. This embodiment has the advantage that it is capable of providing very thin transfer material layers, since there is no, or a minimal amount of, "diluent" present with the dye. The single phase transfer material layer embodiments of the invention are particularly well-suited for certain applications such as variable dot thermal transfer. The glass transition temperatures of certain dyes, especially the ionic dyes, may be relatively high (in some cases substantially in excess of 100° C.), so that substantial energy input per unit area imaged can be required in order to convert the transfer material from its solid condition to a flowable state whereby the material can be transferred imagewise to a receiver sheet. High energy input is not desirable in a portable printer or other imaging apparatus where energy usage can be a major concern, and high energy input per unit area can limit printing speed in a thermal head. Thus, the single phase transfer layers may be preferred for use in thermal transfer applications where energy requirements are not a major concern.

Alternatively, the transfer material layer in a single phase embodiment may comprise a dye non-covalently bonded (typically hydrogen bonded) to a second, non-dye component. For example, one of the dye and the second component may comprise a plurality of acid groups and the other may comprise a plurality of basic groups. It has been found that various dyes (which, as pure compounds, may or may not form amorphous dye solid films) form amorphous, non-crystalline networks with other non-dye components, and that these networks can be used to provide the dye-containing phases of the present invention. The amorphous (non-crystalline) nature of these networks can be confirmed by absence of X-ray diffraction peaks. The use of such networks permits the use according to the present invention of dyes which do not, by themselves, form amorphous dye solid films, thereby widening the choice of dyes available.

While there is no intention to exclude the possibility of other techniques which may be used to form the aforementioned networks, in the presently preferred form of this embodiment of the invention one of the dye and the second, non-dye component comprises a plurality of acid groups and the other comprises a plurality of basic groups, preferably nitrogenous basic groups, and most desirably nitrogenous heterocyclic basic groups. For example, as shown below, the dye may comprise a plurality of carboxylic acid groups and the second, non-dye component may be 1,3-di(4-pyridyl) propane. These two materials form a single phase which appears to be an amorphous hydrogen-bonded network having a glass transition temperature very close to the melting point (46° C.) of the non-dye component. One advantage of this type of system is that a receiving sheet can be used which chemically mordants the transfer material. For example, in the preferred system in which the dye comprises carboxylic acid groups, the receiving sheet may be coated with a layer of a nitrogenous base which chemically bonds to the dye, thereby helping to prevent loss of image resolution by diffusion of the dye.

Preferred dyes for use in such networks include:

XXVI. (yellow)

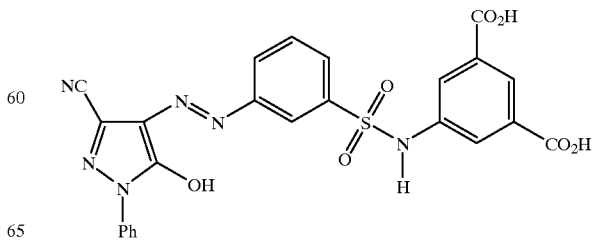

XXVII. (magenta)

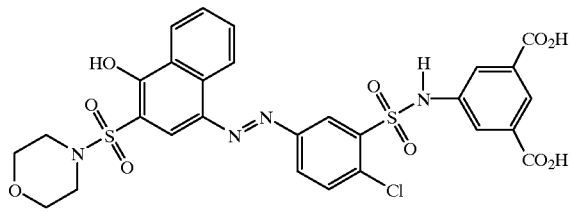

In the two phase embodiment of the invention, the transfer layer comprises a mixture of the dye-containing phase and at least one "thermal solvent", which is a crystalline material. At least a portion of the thermal solvent present in the thermal transfer material layer forms a phase separate from the dye-containing phase. The thermal solvent is believed to be equilibrated between the amorphous form present in the dye-containing amorphous phase and the crystalline form present in the other phase. The amount of thermal solvent which can be present in the dye-containing amorphous phase is thought to be limited by the Tg of the amorphous phase which is preferably at least about 50° C. and particularly preferably about 60° C. In this manner blocking, i.e., sticking together, of the thermal transfer donor sheets can be avoided even under high temperature storage conditions. Preferably, there should be no first order phase change for the entire thermal transfer material layer, i.e., there should be no melting of the layer, below about 50° C. The crystalline thermal solvent melts during the heating of the donor sheet and dissolves or liquefies the dye-containing phase, thereby permitting the transfer of portions of the transfer layer to the receiving sheet to occur at a temperature lower than such transfer would occur in the absence of the crystalline thermal solvent. As can be seen in FIG. 1, the mixture of dye(s) and thermal solvent melts at a temperature which is approximately the same as that of the crystalline thermal solvent itself (and substantially below the melting point of this dye in the powder (crystalline) form).

In some preferred embodiments of the invention the thermal solvent selected for the transfer layer is a good solvent for the dye(s) of the dye-containing phase. In these embodiments, the dot size of the transferred imaging material may be varied by use of a thermal printing head optimized for variable dot printing. In preferred embodiments where a solution is formed under the imaging conditions transfer of the imaging material can be effected to porous receiver materials. In cases where a low melt viscosity is attained receiver materials having relatively low average pore sizes, e.g., less than about 1 $\mu$m may be used.

The two phase embodiment of the invention allows dye transfer to be effected at temperatures substantially lower than those achievable when the transfer layer contains only the same dye-containing phase, and hence with lower energy inputs per unit area imaged. The thermal solvent used can be any fusible material which melts above ambient temperature and which dissolves or liquefies the dye-containing phase to form a mixture which transfers at a lower temperature than that of the dye-containing phase alone. The imaging material which is transferred from the donor sheet to the receiving sheet during the two phase imaging embodiment need not be in the form of a conventional low viscosity true solution, but may be a slurry or similar material. The ratio of thermal solvent to dye may range from about 1:3 by weight to about 3:1. A preferred ratio is about 2:1. Thus, the two phase embodiment of the invention can provide a major reduction of imaging temperature while maintaining a thin donor layer. The thermal solvent may separate into a second phase as the mixture cools after imaging, and preferably the thermal solvent should not form such large crystals that it adversely affects the quality of the resulting image. The thermal solvent preferably has a melting point sufficiently above room temperature such that the donor layer is not tacky at room temperature, and does not melt at temperatures likely to be encountered during transportation and storage of the donor sheet prior to imaging.

The crystalline thermal solvents used in the two-phase embodiments of the invention typically have a melting point in the range of from about 60° C. to about 120° C. and preferably in the range of from about 85° C. to about 100° C. In a preferred embodiment the melting point of the thermal transfer material is high enough that, at the melting point temperature the viscosity of the liquid material is low enough to transfer substantially the entire thickness of the thermal transfer material into the pores of the receiver material in the time allowed for imaging. This property is important in some instances such as variable dot printing, since a roughly gaussian temperature profile is produced over the area of a pixel and should the melted thermal transfer material have a viscosity which may be too high to completely penetrate the pores of the receiver material then there could be formed a relief image in dye at the edges of a dot giving rise to relatively lesser image durability and possibly affecting negatively the transfer of further dye materials in a multicolor system. It is particularly preferred that the thermal solvent have a melting point of about 90° C.

Not all the thermal solvent component of the donor layer, prior to imaging, will crystallize out from the dye-containing phase and form a second phase separate from the dye-containing phase. The amount of thermal solvent in the transfer material layer which is incorporated in the dye-containing phase can be controlled by including additives in the dye-containing phase to make the latter more compatible with the thermal solvent thereby resulting in a higher percentage of the thermal solvent being located in the dye-containing phase. Such additives could be, for example, molecules similar to the thermal solvent which do not crystallize under the conditions of preparation of the donor layer or other additives such as light stabilizers. It is preferred to utilize thermal solvents which form relatively small crystals since these dissolve the dye-containing phase quickly during imaging to provide satisfactory transfer of the dye to the receiver layer.

The relative amounts of thermal solvent which are in the dye containing and second, crystalline phases of the transfer layer can be determined by measuring the heat of fusion of the transfer layer material and comparing the value with the heat of fusion of the same mass of thermal solvent present in the transfer layer. The ratio of the respective values will indicate the proportions of thermal solvent present in the dye-containing phase and the second, crystalline phase.

In the two phase embodiments of the invention a phase change occurs between room temperature and the imaging temperature such that essentially one phase is formed. The dye-containing phase transfer layer, which is not tacky at room temperature, undergoes a composition change such that it has relatively low viscosity at the imaging temperature to allow the imaging material to be transferred to the receiving layer.

In another preferred embodiment more than one thermal solvent is incorporated into the transfer layer. If a transfer layer is used which comprises two (or more) different thermal solvents having differing melting points and chosen so that the thermal solvent having the lower melting point dissolves or liquefies less of the dye-containing phase than the thermal solvent having the higher melting point, the amount of dye-containing phase transferred per imaged pixel during the imaging method varies according to the temperature to which the transfer layer is heated. It has been found possible, with certain imaging systems, to obtain good continuous-tone performance using only two thermal solvents in addition to the dye-containing phase. Such continuous-tone performance is an important advantage of the present invention as compared with conventional thermal mass transfer processes, in which the mass transfer is strictly binary. Alternatively, the use of two or more dyes which have differing solubilities in a single thermal solvent may be employed.

Obviously, the thermal solvent used in any specific imaging system of the present invention must be chosen having regard to the dye-containing phase and other components of the proposed system. The thermal solvent should also be sufficiently non-volatile that it does not substantially sublime from the thin transfer layer during transportation and storage of the donor sheet prior to imaging. Any suitable thermal solvent may be used in accordance with the invention. Suitable thermal solvents include, for example, alkanols containing at least about 12 carbon atoms, alkanediols containing at least about 12 carbon atoms, monocarboxylic acids containing at least about 12 carbon atoms, esters and amides of such acids, aryl sulfonamides and hydroxyalkyl-substituted arenes. Specific preferred thermal solvents include: tetradecan-1-ol, hexadecan-1-ol, octadecan-1-ol, dodecane-1,2-diol, hexadecane-1,16-diol, myristic acid, palmitic acid, stearic acid, methyl docosanoate, 1,4-bis(hydroxymethyl)benzene, and p-toluenesulfonamide. Particularly preferred thermal solvents are TS1 through TS13, as described below herein.

A preferred class of thermal solvents for use in accordance with the invention consists of thermal solvents which have a low volatility. See Example 6 below.

Numerous suitable combinations of specific dyes and thermal solvents which are suitable for use in accordance with the invention are shown in the Examples below.

In a preferred embodiment of the present invention, in the transfer material layer not more than 5% by weight of the material present in the layer should have a molecular weight higher than that of the highest molecular weight dye in the dye-containing phase. The presence of higher amounts of high molecular weight species, particularly polymeric species, results in undesirable, more viscous melts under imaging conditions which can adversely affect transfer of the imaging material to the receiver sheet. Further, this feature of the transfer material layer allows the layer to be coated from a solution which has a relatively low viscosity. It is preferred that the transfer layer include not more than about 2% by weight, and particularly preferably not more than about 1% by weight, of components having a molecular weight higher than that of the highest molecular weight dye in the dye-containing phase. Optimally, the thermal transfer material layer does not include any such higher molecular weight species.

In order to assist those skilled in the art to better understand and practice the thermal transfer recording system of the invention, the requirements of the donor and receiver material and the thermal transfer material layer will now be discussed in relation to certain mathematical formulae. It should be understood that the discussion is explanatory only, and there is no intention to limit the invention in any way.

Although an oversimplification, the Lucas-Washburn equation for capillary flow (1) may be used to analyze the requirements of the donor sheet, assuming complete wetting of the receiver by the ink:

$$t = \frac{2\eta d^2}{\sigma r} \quad (1)$$

where t is the time taken for flow penetration of distance d into the receiver pores, r is the pore radius, σ is the surface tension and η the viscosity of the molten ink. A better approximation for the case of a fluid advancing into a non-wetted capillary, described in "The Kinetics of Wetting: The Motion of a Three Phase Contactline in a Capillary" by P. van Remoortere and P. Joos, *J. Colloid Interface Sci.*, 1991, 141, 348–359, may be obtained by applying the empirical equation (2) for the dynamic advancing contact angle θ.

$$\cos\theta = 1 - 4\left(\frac{\eta v}{\sigma}\right)^{\frac{1}{2}} \quad (2)$$

where v is the velocity of the liquid column, in which case equation (3) is obtained for the time taken for flow penetration:

$$t = \frac{\eta r}{4\sigma} \int_0^X \frac{X^2}{\left(-2 + \sqrt{4+X}\right)} dX \quad (3)$$

where $$X = \frac{4d}{r}.$$

When X>>4, (i.e., d>>r) equation (3) becomes equivalent to equation (1).

For small pore sizes, i.e., large values of d/r, the Lucas-Washburn equation should be a reasonable approximation. In either case, optimization of the donor formulation for flow penetration mass transfer will require minimization of the thickness and melt viscosity of the transferred layer, while maintaining the maximum surface tension consistent with wetting the receiver.

The thickness d' (in centimeters) of a film composed of pure, isotropic dye of density ρ kg/L, molecular weight m kg/mole$^{-1}$ and extinction coefficient ε L mole$^{-1}$ cm$^{-1}$ having a reflection density of 2 (i.e., a transmission density of 1) is given by:

$$d' = \frac{m}{\varepsilon \rho} \quad (4)$$

So, for example, the thickness of a film composed entirely of a dye having extinction coefficient 25,000 L mole$^{-1}$ cm$^{-1}$, molecular weight 0.5 kg/mole and density 1.0 kg/L would be 0.2 micrometers. Generally, this would be the minimum possible thickness for a donor film for thermal mass transfer for a given dye and is the thickness achievable according to the single phase embodiment of the invention. It is preferred to utilize according to the invention a dye for which the ratio of the extinction coefficient, measured at the peak absorbance (in liters per mole per centimeter) to the molecular weight (in grams per mole) is greater than about 10.

Using equation (1), it is possible to estimate the viscosity required for penetration of three layers, each of thickness 0.5 micrometers and surface tension 0.035 N/m, into receiver pores of radius 0.1 micrometers. It may be assumed that the capillary pressure is more significant than the pressure exerted by the thermal printhead. If it is further assumed that the pore volume of the receiver is 50% of its total volume (for example, the interstitial space between porous silica gel particles is about 35% of the total volume, and the silica gel particles themselves are porous), the distance for mass transfer will be about twice the thickness of the donor. The most difficult case is the transfer of the third color into pores which already contain the first two: i.e., the total penetration distance of the combined dye layers into the receiver capillaries will be d=2×3×0.5 micrometers. For reasonable print times, a time for penetration of 1 millisecond is assumed. It is further assumed that the temperature of the layer and the receiver is constant during transfer: clearly an oversimplification, but useful for an order-of-magnitude estimate. With these assumptions, the target viscosity is given by:

$$\eta \leq \frac{t\sigma r}{2d^2}$$

~ 0.19 Pa s (190 cP)

Figure 3:
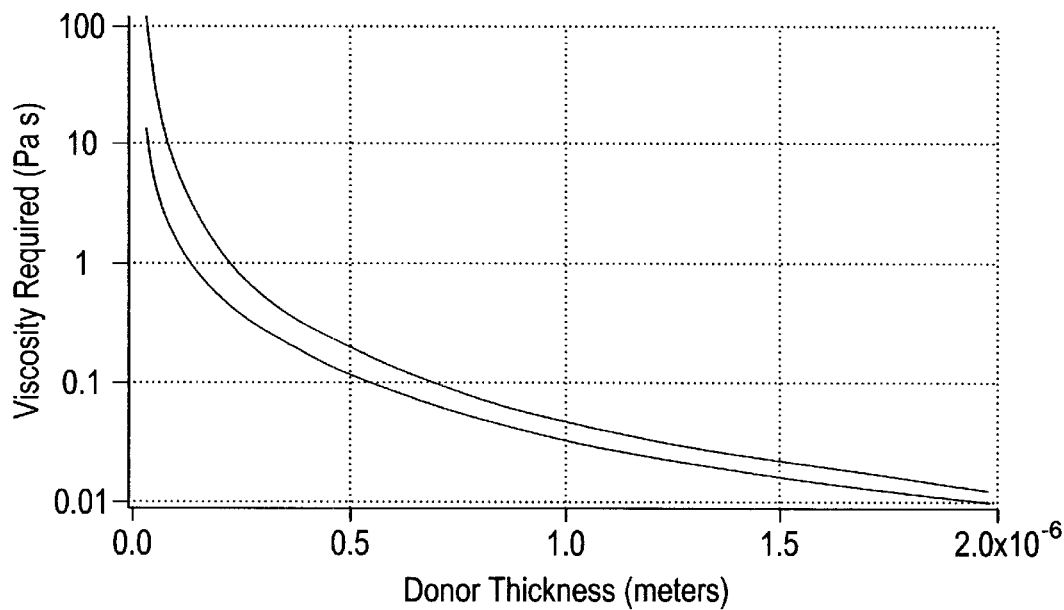
FIG. 3 is an estimate of the viscosity required for transfer of a donor layer of specified thickness into receiver material pores of radius 0.1 μm.

FIG. 3 shows the viscosity requirements predicted by equations (1) (upper curve) and (3) (lower curve) for various donor layer thicknesses.

The relationship between viscosity and temperature for glass-forming materials above their Tg has been extensively discussed in the literature, for example, in "Thermodynamic Aspects of the Glass Transition in Liquids and Plastic Crystals", by C. A. Angell, *Pure & Appl. Chem.* 1991, 10, 1387–1392. Viscosity data can often be fit to the empirical Vogel-Tammann-Fulcher equation:

$$\eta(T) = A\exp\left(\frac{DT_0}{T - T_0}\right) \quad (5)$$

where A, D, and $T_0$ are determined experimentally. The value of D, which for a wide range of materials spans the range of between about 3 and about 50, is thought to be indicative of the nature of the bonding between the molecules that make up the material. In general, a high value of D corresponds to a strong network of bonds (as is found in silica glass, a so-called "strong" liquid, for example) while a low value of D corresponds to weak intermolecular bonding (as exemplified by, say, o-terphenyl, a "fragile" liquid).

Figure 4:
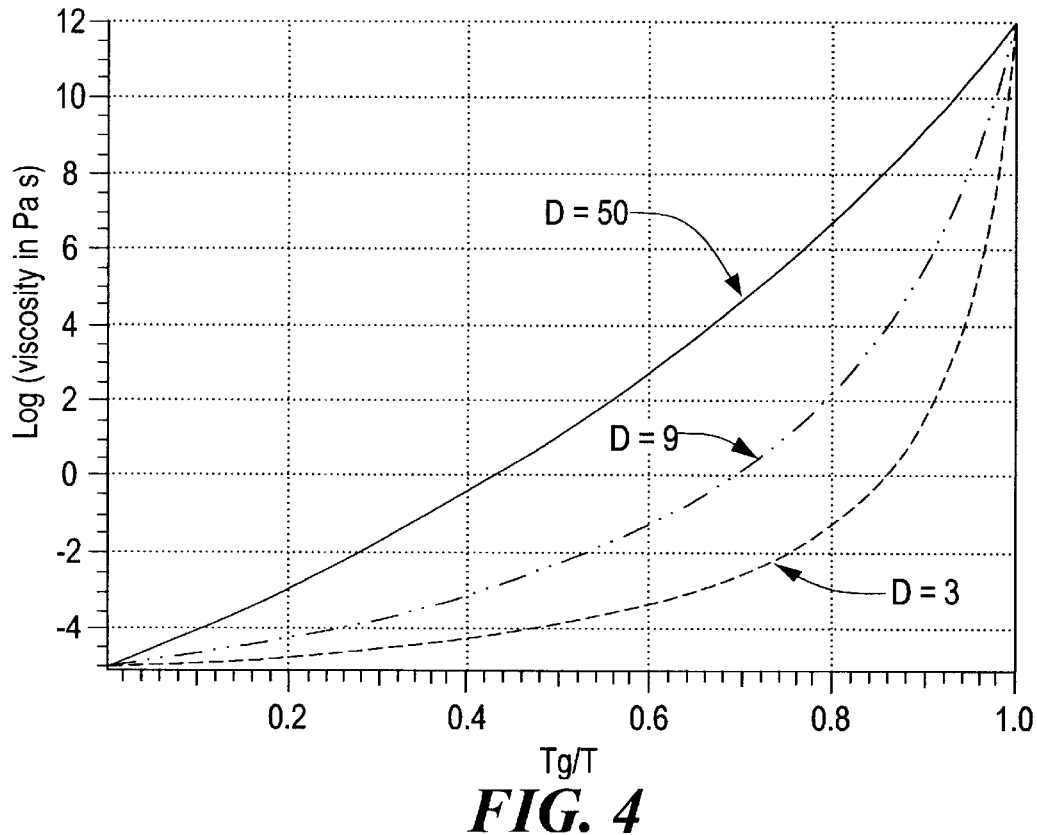
FIG. 4 is a graphical illustration showing the relationship between the viscosity and temperature for liquids above their glass transition temperature as approximated by the Vogel-Tamman-Fulcher equation.

FIG. 4 is a plot of log viscosity as a function of Tg/T showing the behavior of single phase liquids with high, low and mid-D values when heated above Tg. For materials with Tg of greater than room temperature the change in viscosity is sufficient for imaging by differential adhesion but less suitable for fast penetration into small pores.

In the two phase embodiments of the present invention a phase change occurs between room temperature and the elevated imaging temperature such that viscosities much lower than those attainable in the single phase embodiments may be achieved as shown in Example 7 below. The optimum ratio of amorphous dye to thermal solvent in any particular system may be estimated as follows:

As described in "General Viscosity-Composition Relationship for Dispersions, Solutions and Binary Liquid Systems" by J. Kunnen, *Rheol. Acta* 1984, 23, 424–434, the viscosity of binary mixtures of a wide variety of materials has been found, empirically, to obey the relationship shown in equation (7):

$$\frac{\eta}{\eta_0} = \exp\left(\frac{ab\Phi}{1 - a\Phi}\right) \quad (6)$$

where $\eta_0$ is the viscosity of the pure component of lower viscosity (in this case, the molten thermal solvent), $\eta$ is the viscosity of the mixture of components having volume fraction $\Phi$ of the more viscous component (in this case, the dye), and a and b are dimensionless constants. The value of b is dependent on temperature, while a is not. The values of a and b may be determined empirically at a particular temperature, and from them the optimum composition of the layer may be estimated. Since the thickness of the donor layer is inversely proportional to $\Phi$, minimization of the product $\eta$ $d^2$ (which is proportional to time t in the Lucas-Washburn equation(1)) is equivalent to minimization of:

$$\frac{1}{\Phi^2}\exp\left(\frac{ab\Phi}{1 - a\Phi}\right)$$

which gives:

$$\Phi = \frac{4+b}{4a} - \frac{1}{4}\sqrt{\frac{b(b+8)}{a^2}} \quad (7)$$

For typical dyes, a~1 and b~2 (at 90° C.), so $\Phi$=0.38. In other words the optimum ratio of dye to thermal solvent in this case is about 1:1.5.

Since the product $\eta$ d2 is proportional to the time taken for penetration into pores, the lower this value the faster it is possible to print. In the current invention values of the product $\eta$ $d^2$ less than about 0.06 Pa s $\mu m^2$ are preferred.

In the two phase embodiments of the invention it is preferred that the viscosity of the amorphous dye-containing phase be about $10^{12}$ Pa s or the Tg of that phase be not less than about 30° C. above room temperature so that this phase is not tacky at temperatures likely to be reached during storage or in practical use. Thus, the Tg of the dye-containing phase is preferably about 50° C. and more preferably about 60° C.

The receiving layer utilized according to the present invention may comprise any suitable receiving layer material. It is preferred to utilize receiver layers having an average pore size less than about 1 $\mu$m and it is particularly preferred to utilize those having average pore sizes less than about 0.3 $\mu$m. Such receiver material layers do not scatter any substantial amounts of light and provide a desirable glossy appearance. Such microporous receiver layers are commercially available. There are also commercially available receiver materials made up of particles which are themselves porous such that thermal transfer material from a donor layer may occupy pores within the particles as well as interstitial space between the particles. An example of such a receiver materials is described in "Novel Sub-Micron Silica Gels for Glossy Ink Receptive Coatings," D. M. Chapman and D. Michos, IS&T NIP15:1999, pp. 164–168.

The amount of dye(s) present in the transfer layer can vary over a wide range dependent primarily upon the particular dye(s) utilized, the intended imaging application and the desired results. The requisite dye concentration for any specific transfer layer may be determined by routine scoping experiments.

As described above, it is desirable to keep the transfer material layer as thin as possible, consistent with good imaging characteristics, especially the maximum optical density of the image, which typically should be at least about 1.5. The transfer material layer used in the present method typically has a thickness not greater than about 1.5 µm, preferably not greater than about 1 µm. As illustrated in the Examples below, preferred systems of the invention can use transfer material layers having a thickness not greater than about 1.0 µm or even less; satisfactory imaging characteristics and optical densities have been achieved at transfer layer coating weights as low as 0.5 g m², corresponding to a thickness of about 0.5 µm. As described above, preferred thermal transfer material layers also produce liquefied transfer layers having melt viscosities below about 1 Pa s and relatively low surface energy, or surface tension. It is particularly preferred to utilize transfer layers having melt viscosities below about 0.5 Pa s. With such thin layers, low melt viscosities and low surface energies, microporous receiving sheets having the majority of pores less than about 1 µm, and preferably less than about 0.5 µm, in diameter can readily be used, and in many cases microporous receiving sheets having the majority of pores less than about 0.2 µm may be used to produce images having a glossy appearance. According to a preferred embodiment of the invention the melt viscosity of the thermal transfer material is sufficiently low at the melting point of the crystalline thermal solvent to allow substantially all the thermal transfer material to enter the pores of the receiver material.

The ability to use such small-pore receiving sheets is an important advantage of preferred embodiments of the present invention as compared with conventional thermal mass transfer processes. In such conventional processes, the transfer layer comprises a dye or pigment dissolved or dispersed in a vehicle, typically a wax and/or a synthetic polymer. Because of the need to keep the dye or pigment uniformly dissolved or dispersed in the vehicle both during the coating process used to form the transfer layer and during storage and transportation of the donor sheet (during which the donor sheet may be exposed to substantial changes in temperature, humidity and other environmental variables), in practice the dye or pigment typically comprises less than 25 percent by weight of the transfer layer, so that to secure the optical density (around 1.5) needed for high quality full color images, the transfer layer needs to have a minimum thickness of about 1.5 µm. If one attempts to increase the proportion of dye in the transfer layer, both the melt viscosity and the surface energy of the transfer layer tend to increase, and thus such conventional systems cannot be used with small-pore receiving sheets.

The thin transfer layers which can be used in the recording method of the present invention, together with the physical characteristics of the amorphous dye solid layers, provide significant advantages as compared with conventional thermal mass transfer processes. When the present invention is used in a differential adhesion type process, the images produced typically are less susceptible to abrasion than conventional differential adhesion thermal mass transfer images, both because a thinner transfer layer is typically inherently less susceptible to abrasion, and because the amorphous dye solid films used in the present methods, by virtue of their glassy nature, can produce tough, highly coherent layers. Two phase transfer layers of the present invention can also substantially reduce the energy per unit area needed for imaging, which is especially advantageous in, for example portable printers, or in printers which use imagewise absorption of radiation to effect imaging, as discussed below. If, however, protection against abrasion or other adverse environmental factors (such as ultra-violet radiation which might tend to cause fading of the image, or solvents used to wash the image) is desired, a protective overcoat may be placed over the transfer layer on the receiving sheet. Such a protective overcoat could be applied by hot lamination or a similar technique, but is conveniently thermally transferred over the image using the same thermal head or other head source used for the imaging method itself; in a multi-color method, the protective overcoat essentially becomes an extra "color" which is transferred in the same manner as the other colors, except of course that the overcoat will normally be transferred to cover the entire image rather than only selected pixels.

The method steps of the present invention can be carried out by conventional techniques which will be familiar to those skilled in the art of thermal mass transfer imaging. Thus, the heating of the transfer layer may be effected using thermal heads of the linear or traversing types, or hot metal dies. Alternatively, the heating of the transfer layer may be effected by imagewise exposure of the transfer layer to radiation absorbed by the transfer layer or a layer in thermal contact therewith. In some cases, the transfer layer itself may not strongly absorb the radiation used for imaging (for example, cost considerations may indicate the use of infrared lasers which may not be absorbed by visible dyes) and in such cases the transfer layer itself, or a layer in thermal contact therewith, may comprise a radiation absorber which strongly absorbs the radiation used for imaging. If desired, the substrate itself may contain the radiation absorber, or the radiation absorber could be, for example, in a separate layer disposed between the transfer layer and the substrate; this might be desirable, for example, to prevent the radiation absorber being transferred to the receiving sheet together with the transfer layer.

Although the thermal transfer recording system of the invention may most commonly be used to produce visible images to be viewed by the human eye, it is not restricted to such images and may be used to produce non-visible images intended for various forms of machine reading. For example, the present invention may be used to form security codes, bar codes and similar indicia, for example on security and identification documents, and such security and other codes may have "colors" in the infra-red or ultra-violet regions so that the security codes are not obvious to casual inspection but can be read by well known techniques. Accordingly, the term "dye" is used herein to refer to a material which selectively absorbs certain wavelengths of electromagnetic radiation, and should not be construed as restricted to materials which have colors visible to the human eye. The term "color" should be understood in a corresponding manner. The present recording method may also be used to form arrays of colored elements which are not typically thought of as "images", for example color filters for use in liquid crystal displays and other optical or electronic systems.

Recording techniques for use in thermal imaging methods are well known in the art and thus extensive discussion of such techniques is not required here. The novel thermal transfer recording method of the invention may be practiced in accordance with any suitable thermal recording technique.

As is known to those skilled in the thermal transfer recording art, to produce a full color visible thermal mass transfer image it is necessary to transfer at least three different colored transfer layers to the receiving sheet; typically one uses cyan, magenta and yellow (CMY) or cyan, magenta, yellow and black (CMYK) transfer layers. Although the various colored transfer layers can be coated on separate substrates and each transfer layer imaged with a separate thermal head or other heat source, the printing apparatus needed to do so tends to be bulky and complex and difficulties may arise in accurate registration of the separate colored images. Accordingly, in general it is preferred to form the donor sheet by coating the various transfer layers as a sequential array of color imaging areas or "patches", on a single web of substrate in the manner described, for example in U.S. Pat. No. 4,503,095. One patch of each color is used to image a single receiving sheet, the patches being contacted successively with the receiving sheet and being imaged by a single head. Since only a single web (with, in practice, one feed spool and one take-up spool) and single print head are required, the printing apparatus can be made compact.

In multicolor embodiments it is preferred to transfer the different color thermal transfer materials in increasing order of viscosity, i.e., the least viscous color material first followed by the next least viscous and finally the most viscous (assuming all the thermal transfer materials have substantially the same thickness and surface tension). Further, in multicolor embodiments of the thermal transfer imaging system of the invention it is preferred to incorporate a different thermal solvent in each differently colored thermal transfer material layer. In a preferred full color embodiment which utilizes three donor elements, each having a differently colored thermal transfer material, e.g., cyan, magenta and yellow, it is preferred to incorporate one thermal solvent in each transfer layer with at least one of the thermal transfer layers having a thermal solvent which is different than the thermal solvent(s) present in the other thermal transfer layers. It has been found that where the same thermal solvent is used in two or more layers there appears to be a tendency for "blooming" to occur in the final image, i.e., undesirable crystals to form at the surface of the image.

EXAMPLES

The thermal transfer recording system of the invention will now be described further in detail with respect to specific preferred embodiments by way of examples, it being understood that these are intended to be illustrative only and the invention is not limited to the materials, procedures, amounts, conditions, etc., recited therein. All parts and percentages recited are by weight unless otherwise specified.

Example 1

This example illustrates that a wide variety of commercially available and synthetic dyes can form a non-tacky, amorphous solid film suitable for use in the present invention. Commercially-available and custom-synthesized yellow, magenta, cyan and black dyes were screened for amorphous solid film formation in the following manner:

A 5% w/w solution of the test dye in 2-pentanone or 1-butanol was coated onto poly(ethyleneterephthalate) film base of 1.75 mil (44.5 µm) thickness with a #6 Meyer rod. The coating was dried with warm air and tested after 24 hours for crystallization (using polarized light microscopy), abrasion resistance (using a rub test), and tack. The following materials showed no detectable crystallization and passed the rub and tack tests (which were carried out, respectively, by rubbing a cotton swab across the surface of the solid film and by touching with a finger the surface of the solid film).

Color Index (C.I.) Solvent Yellow 13, C.I. Solvent Yellow 19, C.I. Solvent Yellow 36, C.I. Solvent Yellow 47, C.I. Solvent Yellow 88, C.I. Solvent Yellow 143, C.I. Basic Yellow 27, and Kayaset Yellow K-CL (available from Nippon Kayaku);

C.I. Solvent Red 35, C.I. Solvent Red 49, C.I. Solvent Red 52, C.I. Solvent Red 91, C.I. Solvent Red 122, C.I. Solvent Red 125, C.I. Solvent Red 127, C.I. Basic Red 1 and C.I. Basic Violet 10.

C.I. Solvent Blue 5, C.I. Solvent Blue 25, C.I. Solvent Blue 35, C.I. Solvent Blue 38, C.I. Solvent Blue 44, C.I. Solvent Blue 45, C.I. Solvent Blue 67, C.I. Solvent Blue 70, C.I. Basic Blue 1, C.I. Basic Blue 2, C.I. Basic Blue 33, Kayaset Blue K-FL (available from Nippon Kayaku);

Kayaset Black K-R (available from Nippon Kayaku); and Dyes I–XXIV.

The dyes illustrated in this example are preferred dyes for use according to the invention.

Example 2

In this example, there is illustrated a combination of a dye which does not itself form a stable amorphous solid layer with a non-dye component to form an amorphous solid thermal transfer material layer according to the invention. In this example yellow dye (XXV) and magenta dye (XXVI), respectively, were combined with non-dye component 1,3-di(4-pyridyl)propane.

Yellow Dye XXV, whose preparation is described in Example 4 below, was a crystalline solid as determined by X-ray powder diffraction conducted as described above with reference to FIG. 2.

The combination of yellow Dye XXV and 1,3-di(4-pyridyl)propane (which melted at 61.2° C. as a pure material) was prepared by dissolving both materials in tetrahydrofuran, removing the solvent by vacuum evaporation under mild heating to produce a transparent yellow solid. The Tg of various combinations of these components (measured as described in Example 5) is shown in Table I.

TABLE I

| Dye/Non-dye Molar Ratio | Tg (° C.) |
| --- | --- |
| 1:1 | 40 |
| 1:1.5 | 46 |
| 1:2 | 56 |

In none of these mixtures was any crystalline dye or crystalline 1,3-di(4-pyridyl)propane detected by X-ray powder diffraction, DSC or examination with polarized light microscopy.

A similar series of experiments was conducted using magenta Dye XXVI and gave the results shown in Table II.

TABLE II

| Dye/Non-dye Molar Ratio | Tg (° C.) |
| --- | --- |
| 1:1 | 97 |
| 1:2 | 43 |

In the 1:1 sample, X-ray powder diffraction indicated that approximately 10% of the dye was in crystalline form and in the 1:2 sample approximately 5% of the dye was in crystalline form. At a 1:3 ratio no crystalline material was detected.

In the Examples below, the following thermal solvent materials were used:

| Thermal Solvent | Structure |
| --- | --- |
| TS1 | 1,10-Decanediol |
| TS2 | 1,12-Dodecanediol |
| TS3 | 1,12-Dodecanedioic acid, bis(dimethyl amide) |
| TS4 | 1,14-Tetradecanedioic acid, bis(dimethyl amide) |
| TS5 | 1,16-Hexadecanedioic acid, bis(dimethyl amide) |
| TS6 | N-Hexadecan-1-yl acetamide |
| TS7 | N-Decan-1-yl-4-methoxybenzamide |
| TS8 | N-Decan-1-yl-4-chlorobenzamide |
| TS9 | N-(Dodecan-1-yl-aminocarbonyl)morpholine |
| TS10 | Dodecan-1-yl-nicotinamide |
| TS11 | N-Decan-1-yl-4-nitrobenzamide |
| TS12 | Carbamic acid, 1,4-butanediyl-bis-diethyl ester |
| TS13 | N-Dodecyl-4-methoxybenzamide |

Example 3

In this Example, the preparation of some representative thermal solvents used in the present invention is described. TS1 and TS2 were obtained from Aldrich Chemical Company and used as received. TS6 was prepared as described in Sasin et al., J. Am. Oil Chem. Soc. 34, 358 (1957).

TS3 (See also J.Am.Chem.Soc. 110, 5143 (1988)).

6.9 grams (30 mmoles) of the 1,12-dodecanedioic acid was added to 40 mL of thionyl chloride, and the resulting suspension stirred with heating to reflux. After 30 minutes reflux the mixture became clear; over the course of an additional 30 min at reflux a faint yellow color was noted. Much of the excess thionyl chloride was removed by distillation (collected 22 mL). The residual pale yellow oil was diluted with 1,2-dichloroethane (30 mL), and distillation was resumed until an additional 30 mL had been collected. The residual oil was diluted with dichloromethane (25 mL) and added dropwise with stirring at ca. −10° C. (dry ice/IPOH bath) to a stirred mixture of dichloromethane (70 mL) and 40% aqueous dimethylamine (40 g). After stirring an additional 15 minutes the lower (organic) layer was separated, washed with water (75 mL), then with brine (70 mL; an emulsion was encountered possibly because of matching specific gravities of the two solutions. Dilution with additional water (50 mL) and dichloromethane (25 mL) gave a good separation.) The organic layer was evaporated to dryness and recrystallized from ethyl acetate (50 mL). The cake was washed with cold ethyl acetate (60 mL) and dried in vacuo to 6.49 g (76%) of colorless plates, mp 83–84° C. Fast atom bombardment (FAB) ionized mass spectrum gave a molecular ion at M/e=313 (M+1).

TS4

A mixture of technical grade 1,14-tetradecanedioic acid (dodecanedicarboxylic acid) (5.08 g, 20 mmol), toluene (11.6 g), and thionyl chloride (5.95 g, 50 mmol) was stirred at gentle reflux one hour, left at 20° C. overnight, then refluxed three hours. 20 mL of distillate was then collected, and the residual solution cooled to 20° C. and added to cold solution of 40% aqueous dimethylamine in water (40 mL) to give a colorless precipitate which was collected by filtration, washed with toluene (20 mL), and dried, then recrystallized from ethyl acetate to give 2.90 g of colorless plates, mp 85–87° (lit 91-92° C., Soldi et al., J. Amer. Chem. Soc. 110, 5137 (1988)). FAB ionized mass spectral molecular ion at M/e=313 (M+1).

TS5 a. Synthesis of 1,16-hexadecanedioic acid.

A solution of the tetramethyl 1,1,14,14-tetradecanetetracarboxylate (prepared as described in J. Am. Chem. Soc. 1990, 112, 8458–8465, 10 g, 23.3 mmol) in 30 cm³ of acetic acid and 7.5 cm³ of concentrated hydrochloric acid was stirred at reflux for 48 h. The solution was allowed to cool during which time the product precipitated. Water was added to aid filtration. Product was filtered, washed with water and air dried. The di-acid was recrystallized from ethyl acetate, filtered and vacuum dried.

Yield=5.0 g (75%)

Mp. 122–124° C. (lit. 124–126° C.)

b. Synthesis of TS5 (Anal. Chem. 66, 20, 1994, 3449–3457)

A mixture of 1,16-hexadecanedioic acid (5 g, 17.5 mmol) and thionyl chloride (3.83 cm³, 6.25 g, 52.5 mmol) in toluene (25 cm³) was stirred at a gentle reflux for 4 h, then at room temperature overnight. The toluene and excess thionyl chloride were removed by distillation. The solution was allowed cool to 20° C., then added slowly to a cold solution (5° C.) of 40% aqueous dimethylamine (40 cm³). The temperature was maintained at 5–10° C., product precipitated upon addition. Product was filtered, washed with toluene (10 cm³) and air dried, then recrystallised from ethyl acetate.

Yield=4.25 g (71%)

Mp. 91–93° C. (lit. 91–92° C.)

TS7

To a mixture of decylamine (3.7 g, 0.024 mol) and triethylamine (2.4 g, 0.024 mol) in dichloromethane (50 ml), 4-methoxybenzoyl chloride (4.0 g, 0.024 mol) in dichloromethane (10 ml) was added dropwise while the temperature was maintained at 0° C. in an ice-salt bath. The resulting mixture was stirred at this temperature for 1 hour and was then gradually warmed to room temperature and stirring continued for another 2 hours. After being washed successively with water, 2% hydrochloric acid and water, the organic layer was brought to dryness by evaporation and the resulting product was crystallized from methanol/water to give the title compound (5.9 g, 0.020 mol) in 85% yield. m.p. 81.0–82.0° C.

TS8

To a mixture of decylamine (3.6 g, 0.023 mol) and triethylamine (2.3 g, 0.023 mol) in dichloromethane (50 ml), 4-methoxybenzoyl chloride (4.0 g, 0.023 mol) in dichloromethane (10 ml) was added dropwise while the temperature was maintained at 0° C. in an ice-salt bath. The resulting mixture was stirred at this temperature for 1 hour and was gradually warmed to room temperature and stirring continued for another 2 hours. After being washed successively with water, 2% hydrochloric acid and water, the organic layer was brought to dryness by evaporation and the resulting product was crystallized from methanol/water to give the title compound (6.4 g, 0.022 mol) in 94% yield. m.p. 76.0–78.0° C.

TS9

Aminododecane (7.5 g, 40.5 mmol) and triethylamine (5.85 cm³, 4.25 g, 42 mmol) were dissolved in dichloromethane (100 cm³). The solution was cooled to 5° C., followed by the slow addition of morpholine carbonyl chloride (4.72 cm³, 6.05 g, 40.5 mmol). The reaction mixture was refluxed for 0.5 hour, then washed with water (200 cm³). The volume of reaction mixture was reduced to 50 cm³. Upon cooling the product crystallized outand was filtered and air dried.

Yield=6.11 g (51%)

TS10

Nicotinoyl chloride hydrochloride salt, (5 g, 28 mmol) was added to a flask containing 1-dodecylamine (5.2 g, 28 mmol), triethylamine (5.6 g, 56 mmol) and dichloromethane (100 mL). The moderately exothermic reaction warmed the solvent to reflux and the reaction was allowed to stir for 30 min. The reaction mixture was poured into water (200 mL) and the layers were separated. The organic layer was cooled on ice and a white precipitate formed. The solid was filtered and air dried affording 6.5 g (80%) TS10, (m.p. 73–76° C.).

TS11

To a mixture of 1-decylamine (3.4 g, 0.022 mol) and triethylamine (2.4 g, 0.024 mol) in dichloromethane (60 ml), 4-nitrobenzoyl chloride (4.0 g, 0.022 mol) was added in several portions while the temperature was maintained at 0° C. in an ice-salt bath. The resultant mixture was stirred at this temperature for 1 hour and was then gradually warmed up to room temperature and continued to stir for another 2 hours. After washing with water, 2% hydrochloric acid and water, the organic layer was brought to dryness by evaporation and the resultant product was crystallized from methanol to give the title compound (6.5 g, 0.020 mol) in 96% yield. m.p. 90.0–91.0° C.

TS12

To a 5 L 3-necked flask equipped with a mechanical stirrer, a cooling bath and a thermometer, there were added, 109.25 g (0.79 mol) of potassium carbonate dissolved in 237.49 mL of water and 28.5 g (0.32 mol) of 1,4-diaminobutane in 158.3 mL of toluene. The solution was stirred and cooled in an ice water bath. A solution of 77.27 g (0.71 mol) of ethylchloroformate in 79.1 mL of toluene was added to the cooled reaction mixture over a 1 hour period. After the addition of the ethylchloroformate/toluene solution was complete, the reaction mixture was stirred in the ice bath for 15 minutes, warmed to room temperature, stirred for 1 hour and heated for half an hour at 65° C. The reaction mixture was transferred to a separatory funnel. The hot organic layer was separated and quickly filtered through a 1 inch bed of anhydrous magnesium sulfate. Toluene (63.3 mL) was added to the aqueous layer and the mixture was stirred and heated at 65° C. for 10 minutes. The hot organic layer was separated and quickly filtered through the same 1 inch bed of anhydrous magnesium sulfate. The filtrates were combined, cooled to room temperature, diluted with 633.3 mL of heptane and refrigerated for 3 hours. The solid that precipitated was filtered, rinsed with 2×158.3 mL of heptane and dried in the vacuum oven under full vacuum for 16 hours to provide 63.33 g of TS-12. HPLC analysis indicated 96 wt. % and a 100 area %.

TS13

To a three-neck round bottom flask equipped with a mechanical stirrer, thermometer and nitrogen inlet, p-anisic acid (1.0 kg, 6.6 mol) and dodecylamine (1.22 kg, 6.6 mol) were added. The mixture was heated until the temperature reached 220° C. and bubbles were observed to form during the heating. The reaction was maintained at this temperature until no more bubbles formed (about 2.0 hours). NMR confirmed the reaction was complete at this point. The reaction mixture was cooled to 110° C. and then transferred into n-butanol (4 L). After standing at room temperature overnight, the product which precipitated out from the solution was collected by filtration and dried at 60° C. overnight. The product (1.5 kg) was obtained in 71.2% yield. m.p. 91–92° C. $^1$H NMR (300 MHz, CDCl$_3$). δ 0.82 (3H, t, CH$_3$), 1.24 (18H, m, CH$_2$), 1.55 (2H, m, CH$_2$), 3.42 (2H, m, CH$_2$), 3.80 (3H, s, CH$_3$), 6.10 (1H, br, NH), 6.40 (2H, d, aromatic), 7.70 (2H, d, aromatic) ppm; $^{13}$C NMR (75 MHz, CDCl$_3$): 14.30, 22.88, 27.23, 29.54, 29.75, 29.79, 29.82, 29.84, 29.94, 32.10, 40.26, 55.57, 113.86, 127.34, 128.80, 162.20, 167.20 ppm.

Example 4

In this Example, the preparation of some of the representative dyes used in the present invention is described. Dyes IV, V, VI, VII, and VIII are all described in U.S. Pat. No. 3,134,764. Dye IX is described in U.S. Pat. No. 3,135,606. Dye X is described in U.S. Pat. No. 3,691,210. Non-dye component 1,3-di(4-pyridyl)propane was available from Aldrich Chemical Co. and was used as received. All temperatures recited are in degrees Centigrade.

Dye I a. Preparation of 3-ethoxycarbonyl-5-hydroxy-1-phenyl-4-(4-phenylazo)pyrazole.

To a solution of concentrated hydrochloric acid (6 mL, 0.9 mol) in water (75 mL) in a 250 mL 3-neck flask was added at 20° a solution of p-dodecylaniline (5.22 g, 20 mmol) in ethanol (5 mL). To the resulting thick suspension was added, with vigorous mechanical stirring at 10° a solution of sodium nitrite (1.38 g, 20 mmol) in water (15 mL), over the course of 30 min. The resulting orange slurry was diluted with water to 230 mL and quenched into cold water (200 mL). The slurry was filtered and the cake washed with water (80 mL) to give red-orange prisms, still slightly water-wet, which were recrystallized from ethanol (450 mL) to provide, after drying in vacuo, 8.58 g (85%) of gold-colored matted plates.

b. Preparation of Dye.

A solution of this ethyl ester (1.00 g, 2.0 mmol) in n-hexylamine (7.2 g) was stirred at 100° with occasional venting to allow ethanol to escape. After four hours the mixture was cooled to 20° and left for 12 hours, then quenched into 100 mL of ice-water containing 10 mL of acetic acid to give a golden precipitate which was collected by filtration, washed with water (30 mL), and dried to give 1.16 g (104%) of orange-yellow plates which could be recrystallized from 1:1 methanol/ethanol.

Dye II

A mixture of 3-ethoxycarbonyl-5-hydroxy-1-phenyl-4-(4-phenylazo)pyrazole (0.504 g, 1.0 mmol, prepared as described for Dye I above), tyramine (0.248 g, 1.8 mmol) and anhydrous sodium acetate (0.10 g, 1.2 mmol) in ethanol (7 mL) was heated to reflux under nitrogen. After three hours the mixture was diluted to 11 mL by addition of ethanol and cooled to deposit solid which was collected by filtration and dried overnight to provide 0.32 g (53%) of yellow-orange plates. Mass spectral FAB molecular ion at m/e 597 (M+1); absorbance maximum at 464 nm in dichloromethane.

Dye III a. Preparation of N-(2-ethylhexyl)-1-phenylpyrazol-5-one-3-carboxamide (5941-106).

A mixture of ethyl pyrazol-5-one-3-carboxylate (4.64 g, 20 mmol) in 2-ethylhexylamine (10.0 g, 123 mmol) was stirred at reflux under nitrogen. After four hours the mixture was cooled to 20° and quenched into 100 mL of ice-water containing 10 g concentrated HCl. The mixture was extracted with dichloromethane (70 mL) and the organic layer washed with water (100 mL), then brine (70 mL), and evaporated to a reddish-brown oil which was chromatographed (silica gel eluted with 2:1 ethyl acetate/hexanes). The main fraction was collected as a tan solid weighing 2.67 g (50%), mp 70.5–74°.

b. Preparation of 2,4-diactoxybenzaldehyde.

To a stirred suspension of 2,4-dihydroxybenzaldehyde (5.0 g, 36 mmol) and acetyl chloride (5.15 mL, 72 mmol) in dichloromethane (150 mL) was added dropwise pyridine (5.82 mL, 72 mmol). The reaction mixture became almost transparent, and was stirred three hours. An additional 2.58 mL (36 mmol) of acetyl chloride and 2.91 g (36 mmol) of pyridine was added and the reaction stirred an additional two hours. At this point it was quenched into water (150 mL) and extracted with diethyl ether (70 mL). The ether layer was dried (magnesium sulfate) and concentrated to give a yellowish oil which crystallized upon standing, providing 5.46 g (68%).

c. Preparation of 2,4-diacetoxy-4'-nitrostilbene.

To a suspension of (4-nitrobenzyl)triphenylphosphonium bromide (11.72 g, 24.5 mmol) in tetrahydrofuran (100 mL) was added dropwise a solution of potassium tert-butoxide (2.99 g, 24.5 mmol) in THF (100 mL) The reaction mixture turned bright red, and 2,4-diacetoxybenzaldehyde (5.46 g, 24.5 mmol, prepared as described in b. above) in 50 mL of THF was added dropwise. The reaction was stirred at 20° under nitrogen for 24 hours, then quenched into dilute acetic acid (100 mL) and extracted with dichloromethane (100 mL). The organic layer was dried (magnesium sulfate) and evaporated to dryness, then chromatographed (silica gel, eluted with 5% methanol in dichloromethane) to give a mixture of cis- and trans-isomers as yellow needles weighing 3.722 g (44%).

d. Preparation of 1-(4-aminophenyl)-2-(2,4-diacetoxyphenyl)ethane.

The nitrostilbene (prepared as described in c. above) was dissolved in ethanol (100 iL) and 10% Pd/C (0.5 g) was added to the solution. This mixture was hydrogenated for 14 hours using a Parr shaker at an initial pressure of 45 psi. The catalyst was removed by filtration and the solution evaporated to give 2.947 g (87%) of crude product used in the next step.

To a solution of concentrated HCl (1.41 g) in water (10 mL) at 20° was added the aminodiarylethane from above (1.239 g, 3.9 mmol). To the resulting solution was added a solution of sodium acetate (0.483 g, 5.9 mmol) and sodium nitrite (0.269 g, 3.9 mmol) in water (10 mL). To this mixture was added N-(2-ethylhexyl)-1-phenylpyrazol-5-one-3-carboxamide (1.228 g, 3.9 mmol, prepared as described in a. above) dissolved in acetone (10 mL) A dark brown phase separated; the mixture was diluted with ethyl acetate (10 mL) The organic phase was isolated, dried (magnesium sulfate) and evaporated to 1.892 g of an orange oil which was used in the next step without further purification.

The oil was suspended in water and potassium hydroxide (0.325 g, 5.8 mmol) was added. The resulting solution was stirred at 20° for one hour, then quenched into dilute HCl (50 mL) to give an orange precipitate which was filtered. The filter cake was chromatographed (silica gel, eluted with 20% ethyl acetate in hexanes). Some material was lost because of crystallization on the column, but the pure product was collected as 0.23 g (10%) of golden plates.

Dye XI
Tetrabutylammonium 2-(3-hydroxy-quinolin-2-yl)-1,3-dioxo-indan-5-carboxylate.

To a 250-mL round-bottom-flask, 3-hydroxy-2-methylquinoline-4-carboxylic acid (4.0 g, 0.02 mol), 1,2,4-benzenetricarboxylic anhydride (3.8 g, 0.02 mol) and 1,2,4-trichlorobenzene were added and the mixture was refluxed for 2 hours under nitrogen. After the mixture was cooled to room temperature, a yellow precipitate formed and was collected by filtration. The solid was washed with methanol, refluxed with water and collected by hot filtration to give 2-(3-hydroxy-quinolin-2-yl)-1,3-dioxo-indan-5-carboxylic acid as yellow powder (3.2 g, 0.009) in 48% yield. m.p.>350°. UV-Vis (DMSO) $\lambda_{max}$: 424 (32,200), 442 (39,600). In order to convert the acid form into the corresponding tetrabutyl ammonium salt, 2 g of the acid was suspended in methanol (100 mL) and tetrabutyl ammonium hydroxide (1.0 M, 6.0 mL) was added slowly. Because the deprotonation of the first proton (carboxylic acid proton) of the yellow dye does not change its absorption spectrum while the deprotonation of the second proton (hydroxy group) shifts its absorption significantly, the addition of base can be followed easily by UV-Vis spectroscopy. After most of the yellow solid went into the solution, the mixture was filtered and the filtrate was collected. The solvent was removed under vacuum and the resulting residue was washed with ether to give the title compound (3.2 g). UV-Vis ($CH_2Cl_2$) $\lambda_{max}$: 424 (32,400), 442 (40,000).

Dye XII 3,6-Bis(N-methyl-2-chloroanilino)-9-(2'-sulfo) phenylxanthene (1.0 g, 1.6 mmol, prepared as described in U.S. Pat. No. 4,304,834) was converted to the corresponding sulfonyl chloride by treatment with phosphorus oxychloride (1 mL) in acetonitrile. The reaction mixture was warmed to 50° for 1 hour. The acetonitrile and excess $POCl_3$ were removed under vacuum and the remaining sulfonyl chloride was placed under high vacuum overnight. It was then dissolved in 15 mL dry acetonitrile, di-n-hexylamine (4 mL) was added and the solution was heated at reflux for 30 min. The acetonitrile was removed under reduced pressure and the residue was washed with several aliquots (20 mL) of hot hexanes. It was then dissolved in ethyl acetate, washed with a 1M aqueous solution of hydrochloric acid, and then with water, and then dried over sodium sulfate. Filtration and evaporation of the ethyl acetate afforded ~1 g dye XII. Small amounts of impurities were removed by silica gel chromatography (eluent. 5% methanol/methylene chloride). The structure was confirmed by $^1H$ & $^{13}C$ NMR, and mass spectrometry.

Dye XIII 3,6-Dichloro-9-(2'-sulfo)phenylxanthene (dichlorosulfofluorescein, prepared as described in U.S. Pat. No. 4,429,142) (1.8 g, 4.56 mmol) was treated with 3-amino-4-chloro-(N-(2-ethylhexyl))benzamide (2.8 g, 10 mmol) in N-methyl pyrrolidone (NMP, 25 mL) at 200° for approximately 8 hours. The reaction mixture was cooled and poured into aqueous hydrochloric acid (400 mL of a 0.5 M solution). The dye precipitated and was filtered off, washed with water and dried. It was then purified by silica gel chromatography (eluent: 5% methanol/methylene chloride) to give ~1 g XIII. The structure was confirmed by $^1H$ & $^{13}C$ NMR, and mass spectrometry.

Dye XIV

The dye XIII (400 mg) was N-methylated by treatment with potassium t-butoxide (112 mg, 1 mmol) in NMP for 1 hour, followed by addition of iodomethane (284 mg, 2 mmol) and further stirring of the mixture for approximately 16 hours. The reaction mixture was then poured into aqueous hydrochloric acid 50 mL of a 0.5 M solution). The solid precipitate was filtered off and purified by silica gel chromatography (eluent: 5% methanol/methylene chloride) to give dye XIV (340 mg). The structure was confirmed by $^1H$ & $^{13}C$ NMR, and mass spectrometry.

Dye XV

Dichlorosulfofluorescein (2 g, 5 mmol) was reacted with 3-amino-4-methylbenzoic acid (3 g, 11 mmol) in NMP at 180° for several hours. The reaction mixture was cooled and poured into aqueous hydrochloric acid (400 mL of a 0.5 M solution). The dye precipitated and was filtered off, washed with water and dried. It was then dissolved in NMP (50 mL) and treated with a 50% aqueous solution of sodium hydroxide (10 mmol) following which dimethylsulfate (2.5 g, 20 mmol) was added. The resultant mixture was then stirred at room temperature for 4 hours, after which it was poured into aqueous hydrochloric acid (400 mL of a 0.5 M solution). The precipitate was removed by filtration and dried.

A portion (500 mg, 0.75 mmol) of this crude dye (possessing two carboxyl groups) was converted to the bis-amide by treatment with diphenylphosphorylazide (500 mg, 1.8 mmol), triethylamine (181 mg, 1.8 mmol), and 2-ethylhexylamine (232 mg, 1,8 mmol) in NMP (5 mL) at 0° for 1 hour and then warming to room temperature. The reaction mixture was then poured into hydrochloric acid (50 mL of a 1M aqueous solution), filtered and dried. The crude product was then purified by silica gel chromatography (eluent: 10% methanol/methylene chloride) to give dye XV (400 mg). The structure was confirmed by $^1$H & $^{13}$C NMR, and mass spectrometry.

Dye XVI

This dye was prepared in two steps as described below:

a. Preparation of N-(but-1-yl)-2-aminobenzamide.

n-Butylamine (3.0 g, 0.041 mole) and water (75 mL) were combined in a 250-ml 3-necked round bottomed flask equipped with an overhead stirrer. The mixture was rapidly stirred and powdered isatoic ahydride (4.08 g, 0.025 mole) was added portionwise over 2 minutes time. A slight exotherm occurred and a white solid precipitated from solution. The mixture was stirred for 10 minutes, then a heating mantle and reflux condenser were attached and the mixture was heated at reflux for 10 minutes. The heating mantle was removed and the mixture was stirred overnight at room temperature. The precipitated white solid was collected on a Buchner funnel, washed with water (250 ml), and dried in vacuo, then recrystallized from petroleum ether to yield product as a white powder (4.3 g, 90% yield, m.p. 83–84°). Product structure was confirmed by $^1$H & $^{13}$C NMR.

b. Preparation of Dye XVI.

Dichlorosulfofluorescein (1.0 g, 0.025 mole), N-(but-1-yl)-2-aminobenzamide (1.0 g, 0.0052 mole, and NMP (10 ml) were combined in a 50-ml round bottomed flask equipped with a stirbar, and the mixture was stirred and heated to 170° under nitrogen. The progress of the reaction was followed by TLC (K5F silica, 7.5% MeOH/CH$_2$Cl$_2$). After 3 hours, the reaction was complete. The reaction mixture was cooled to room temperature and slowly poured into hydrochloric acid (100 mL of a 1M aqueous solution). A purple precipitate formed. The mixture was stirred for 30 minutes, then the crude product was collected on a Buchner funnel, washed with water, and air-dried.

The crude product was purified by chromatography on silica gel (200 ml dry volume, eluting with 5–10% methanol in dichloromethane). The product-containing fractions were combined and evaporated to yield a purple powder (1.5 g, 85% yield), with a $\lambda_{max}$=536 nm, $\epsilon$=34100 in dimethylformamide (DMF) solution. The structure was confirmed by $^1$H & $^{13}$C NMR, and mass spectrometry.

Dye XVII

This dye was prepared in two steps as follows:

a. Synthesis of 3,6-Bis(2-(but-2-yl)anilino)-9-(2'-sulfo) phenylxanthene

Dichlorosulfofluorescein (4.1 g, 10 mmol.), 4-(but-2-yl) aniline (3.8 g, 25 mmol.) and tributylamine (4.7 g, 25 mmol) were taken in a 250 mL round bottomed flask. NMP (50 mL, solvent) was added and the reaction mixture was stirred magnetically and heated under nitrogen atmosphere in an oil bath at about 130° for two hours. The reaction was cooled to room temperature and was poured into cold water (200 mL) containing concentrated hydrochloric acid (10 mL) in a beaker with rapid stirring. The mixture was refrigerated for 2 hours, after which the precipitated dye was filtered under suction and washed successively with water (75 mL) dilute sodium bicarbonate solution (50 mL) and water (2×75 mL). The dye was dried in air overnight and in vacuum oven at 45° for two hours to give 6.3 g (quantitative yield) of magenta-copper powder.

b. Synthesis of Dye XVII.

3,6-Bis(2-(but-2-yl)anilino)-9-(2'-sulfo)phenylxanthene (1.6 g, 2.5 mmol) (prepared as described in a. above) was dissolved in DMF (40 mL) in a 250 mL round bottomed flask under nitrogen atmosphere. The solution was stirred magnetically and potassium t-butoxide (618 mg, 5.5 mmol) was added, resulting in thhe formation of a greenish blue solution. The reaction was stirred at room temperature for 30 min. Ethyl bromoacetate (920 mg, 5.5 mmol) was added and the reaction was stirred at room temperature for 1 hour, and at 70–80° for 4 hours. The reaction was cooled to room temperature, and potassium 1-butoxide (2 mmol) was added followed by ethyl bromoacetate (2 mmol). The reaction was further stirred at 75–80° for 2 hours. The reaction mixture was cooled to room temperature and quenched into 200 mL of water with stirring, and refrigerated for 2 hrs. The magenta dye was filtered under suction, successively washed with water (25 mL), 1N HCl (25 mL) and water (2×50 mL) and dried in vacuum oven at 40° for 4 hours to give 1.65 g (80%) of Dye XVII. The structure was confirmed by $^1$H & $^{13}$C NMR, and mass spectrometry.

Dye XVIII a. Dichlorosulfofluorescein (63.6 g, 157 mmol) was suspended in 250 mL n-methylpyrrolidinone. To this suspension was added a mixture of 2,3-dimethylaniline (10.5 g, 86.6 mmol), 2,4-dimethylaniline (10.5 g, 86.6 mmol), 2,5-dimethylaniline (10.5 g, 86.6 mmol), and 2-ethylaniline (10.5 g, 86.6 mmol). The reaction temperature immediately rose to 55° C. and the dichlorosulfofluorescein dissolved. Once the reaction had cooled to 30° C., 2,6-lutidine (33.7 g, 314 mmol) was added. The reaction was then heated at 135° C. for 5 hours. The cooled reaction was poured into 200 mL of 1.5% HCl. The solid that formed was filtered and washed with water until the filtrates were colorless. The wetcake was dried at 50° C. under vacuum to give 79.1 g of purple solid. The solid analyzed at 85% by weight, corresponding to an 81% chemical yield.

b. The undried wet-cake from a reaction run as described above (49.88 g, containing an estimated 15.0 g, 26.1 mmol of dye intermediate) was slurried with 135 mL of methylene chloride. This was treated with 35 mL of water containing 50% aqueous sodium hydroxide (13.0 g, 162.5 mmol). The stirred suspension was treated with dimethylsulfate (9.85 mL, 104.0 mmol) and was stirred overnight. A new magenta material, not starting material, monomethylated or dimethylated xanthene was observed by tlc and LC. This material was assigned the hypermethylated dye. The reaction was treated with triethylamine (3.0 mL, 21.6 mmol) and was stirred overnight, after which time the hypermethylated material had gone. The phases were separated and the methylene chloride phase was washed twice with 5% HCl and once with water. The methylene chloride phase was concentrated to approximately half its volume, and 1-butanol (78.7 g) was added. The methylene chloride was gradually distilled off as further 1-butanol was added. At the end of the distillation, the 1-butanol solution weighed 60.3 gms, and contained approximately 25% w/w of the dye. This solution of dye in 1-butanol was used without further purification.

Dye XIX

Dye XX (3.3 g, 5 mmol) was taken with 150 mL of acetonitrile in a 500 mL round bottomed flask under nitrogen. About 2 g (excess) of phosphorus oxychloride was added and the mixture was heated at 65–70° for 2 hrs. The flask was then cooled to room temperature and about 20 mL of diethylamine was added. The reaction was stirred at room temperature overnight and at 50° for 2 hrs. The bulk of the solvent was removed under reduced pressure, the residue was dissolved in 200 mL of dichloromethane (200 mL) and washed with 2M hydrochloric acid and brine. The solution was dried over magnesium sulfate, and solvent was removed under reduced pressure to obtain 5 g of crude product, which was purified by silica gel chromatography to obtain 2.5 g (70%) of the pure cyan dye. The structure was confirmed by $^1$H & $^{13}$C NM, and mass spectrometry.

Dye XX

A 10-gallon Pfauldler reactor was charged with N-methylpyrrolidinone (13.43 Kg), 3,6-dichlorosulfofluorescein (1.012 Kg), anhydrous magnesium sulfate (0.151 Kg), and 2,3,3-trimethylindoline (1.008 Kg). The resulting slurry was stirred under nitrogen at 60° for one hour. At this point magnesium oxide (0.101 kg) was added and the mixture heated to 120° and maintained at that temperature for eight hours. It was then cooled to 25°, and a solution of concentrated hydrochloric acid (1.75 kg) in water (23.92 kg) was added over a 90 minute period. The product was collected by filtration and washed with water (7.5 kg or more until the pH of the filtrate is between 5 and 6), then dried in vacuo at 40° to constant weight.

Dye XXI

This dye was prepared in two steps as described below.

a. Preparation of Fluorescein Dimethyl Ether.

Crushed potassium hydroxide (5 g) and DMSO (50 mL) were stirred in a 250 mL round bottomed flask under nitrogen for 15 min. Fluorescein (3.5 g, 10 mmol) was added and the reaction was stirred for 15 min, when a dark orange-red solution was obtained. Iodomethane (6.2 g, 40 mmol) was added all at once and the reaction was stirred at room temperature for 2 hrs and at 40–45° for 1 hr. The reaction was quenched by pouring into ice-water (300 mL) and was refrigerated overnight. The light yellow precipitate was filtered and washed with water (3×100 mL) and dried in vacuum oven. The crude product(2.8 g) was purified by silica gel chromatography to obtain 2 g (56%) of light beige solid.

b. Preparation of Dye XXI.

The fluorescein dimethyl ether prepared in a. above (360 mg, 1 mmol) was dissolved in 5 mL of dichloromethane in a 100 mL round bottomed flask under nitrogen and oxalyl chloride (250 mg) was then added. The reaction was stirred for 30 min and then most of the solvent was removed under reduced presssure. The residue was redissolved in dichloromethane (3 mL). A solution of 0.5 mL of absolute ethanol in 2 mL of dichloromethane was added to the reaction flask and the content was stirred for 1 hour. The reaction was quenched into 50 mL of cold water, and then extracted with dichloromethane (2×25 mL). The organic phase was washed with brine, dilute hydrochloric acid and water, dried over magnesium sulfate, and the solvent was removed to obtain an orange powder (400 mg). The crude material was purified by silica gel chromatography to afford pure yellow dye (250 mg).

The structure was confirmed by $^1$H & $^{13}$C NMR, and mass spectrometry.

Dye XXII

To a solution of Copikem 16 (available from Hilton-Davis Co.) (2.80 g, 5 mmol) in methylene chloride (20 mL) was added dropwise oxalyl chloride (1.26 g, 10 mmol) over the course of ten minutes at 20° (some foaming was noted). The dark red solution was stirred at 20° for an additional 25 minutes, whereupon the volatiles were evaporated and the residual red gum dissolved in dichloromethane (25 mL). To this solution was added di-n-hexylamine (2.5 g, 20 mmol), and the resulting mixture stirred at 20° for 14 hours. The mixture was washed with water (80 mL), then saturated aqueous sodium chloride (150 mL), evaporated, and chromatographed (silica gel, eluted with 5%, then 7% methanol in dichloromethane) to give 2.247 g (59%) of a dark red glass. Mass spectral FAB molecular ion at M/e 730 (M+1); absorbance maximum at 542 nm in dichloromethane.

Dye XXIII

A mixture of methyl 3,5-dihydroxybenzoate (5.0 g, 29 mmol) and 4-aminomethylpiperidine (10 mL) was stirred under nitrogen at 130° for 14 hours, then cooled to 30° and triturated with dichloromethane (45 mL). Filtration provided a colorless hygroscopic powder which was dried in vacuo to weigh 2.8 g (38%).

To a solution of Copikem 16 (0.7 g, 1.25 mmol) in methylene chloride (4 mL) was added dropwise oxalyl chloride (0.16 g, 1.26 mmol). The resulting deep red solution was stirred at 20° for 30 min, then evaporated to dryness. The residual glass was dissolved in dimethylformamide (2.5 mL) and added to a solution of the substituted piperidine from above (0.48 g, 1.73 mmol) in triethylamine (0.125 g, 1.24 mmol) and dimethylformamide (4 mL) at 5°. The mixture was stirred at 5° for 30 min, then at 20° for 14 hours. It was quenched into water (80 mL) containing concentrated hydrochloric acid (2 mL) and extracted with dichloromethane (35 mL). The organic layer was washed with water (80 mL), then saturated aqueous sodium chloride (35 mL), evaporated to dryness, and chromatographed (silica gel, eluted with 5%, 7.5%, 10%, 12.5%, 15%, and 20% methanol in dichloromethane) to give the desired product as a red glass weighing 0.231 g (22%). Mass spectral FAB molecular ion at M/e 792 (M+1); absorbance maximum at 542 nm in dichloromethane.

Dye XXIV

To a solution of Copikem 35 (0.616 g, 1.0 mmol, available from Hilton-Davis Co.) in dichloromethane (2.5 mL) was added 0.3 mL of oxalyl chloride. After an immediate gas evolution and coloration the reaction mixture was stirred at 20° for 30 min, then evaporated to dryness. The residue was taken up in 1,2-dichloroethane (3 mL) and evaporated to dryness, then dissolved in dichloromethane (3 mL) and added to a solution of diethylamine (0.6 g) in dichloromethane (3 mL). The resulting mixture was stirred at 20° for 30 min, then washed with water (10 mL), dilute hydrochloric acid (5 mL), and water (2×10 mL), evaporated to dryness, and chromatographed (silica gel, eluted with dichloromethane containing 0%, 4%, 5%, 6%, and 7.5% methanol) to give a dark red glass weighing 0.281 g (31%). Mass spectral FAB molecular ion at M/e 673 (M+1); absorbance maximum at 542 nm in dichloromethane, molar absorptivity =25,180 L moles$^{-1}$ cm$^{-1}$.

Dye XXV

To a solution of Copikem 35 (1.23 g, 2.0 mmol) in dichloromethane (3 mL) was added 0.5 mL of oxalyl chloride. The resulting red solution was stirred at 20° for 30 min, evaporated to dryness, dissolved in 1,2-dichloroethane (3 mL), evaporated to dryness, and redissolved in dichloromethane (3 mL). This solution was added to a solution of diethyl iminodiacetate (1.2 g) in dichloromethane (10 mL) and stirred at 20° for one hour. At this point the solution was washed with water (10 mL), dilute HCl (10 mL), and brine (10 mL), evaporated to dryness, and chromatographed (silica gel eluted with dichloromethane containing 0%, 1%, 2%, and 4% methanol), providing 1.036 g (63%) of a dark red gum. Mass spectral FAB molecular ion at M/e 788 (M+1); absorbance maximum at 542 nm in dichloromethane.

Dye XXVI

3-Cyano-4-(3-chlorosulfonylphenylazo)-1-phenyl-5-pyrazolone (7.5 g, 18.5 mmol, prepared as described in U.S. Pat. No. 5,658,705) was reacted with dimethyl-5-aminoisophthalate (4 g, 19 mmol) in tetrahydrofuran and 2.6 mL triethylamine at room temperature. After 1 hour the reaction was complete, and the reaction mixture was poured into 500 mL water. The orange precipitate which formed was filtered off and washed with water. Air drying afforded 6.4 g of crude diester, which was then dissolved in a 1:1 mixture of tetrahydrofuran and ethanol (100 mL). A 1M aqueous solution of potassium hydroxide (25 mL) was then added, and the resultant mixture was heated at reflux. After several hours the hydrolysis was complete and most of the organic solvents were removed under reduced pressure. The aqueous mixture was acidified with a concentrated aqueous solution of hydrochloric acid, and the solid diacid was removed by filtration and washed with water. After drying, it was recrystallized from aqueous acetone affording 5 g of pure dye XXVI. The structure was confirmed by $^1$H & $^{13}$C NMR, and mass spectrometry.

Dye XXVII 2-(Morpholinosulfamoyl)-4-(3-chlorosulfonyl-4-chlorophenylazo)-5-methylsulfonamido-1-naphthol (5 g, 8.53 mmol, prepared as described in U.S. Pat. No. 5,658,705) was stirred with dimethyl-5-aminoisophthalate (2 g, 9.3 mmol) in a solution of triethylamine (10 mL) in THF (60 mL). After stirring several hours at room temperature the reaction was complete, and the mixture was poured into water (500 mL) containing concentrated hydrochloric acid (100 mL) and stirred overnight. The dark orange-red solid was filtered and washed with water. The wet solid diester was suspended in a mixture of ethanol (~200 mL) and a 1M aqueous solution of sodium hydroxide (100 mL), and the mixture was heated at reflux for several hours until hydrolysis was complete. The reaction mixture was then acidified with concentrated bydrochloric acid and the product was filtered off and washed with water. The crude dye was recrystallized from hot ethanol, affording 4.8 g of pure dye XXVII. The structure was confirmed by $^1$H & $^{13}$C NMR and mass spectrometry.

In Examples 5–14 below, the following materials are used:

| Dye | Color | Structure |
|---|---|---|
| Y1 | Yellow | Structure IV above |
| Y2 | Yellow | XXV + XXVII (1:2 mole ratio) |
| Y3 | Yellow | C.I. Solvent Yellow 88 |
| Y4 | Yellow | C.I. Solvent Yellow 13 |
| M1 | Magenta | VII |
| M2 | Magenta | XII |
| M3 | Magenta | C.I. Solvent Red 127 |
| M4 | Magenta | XVIII |
| C1 | Cyan | IX |
| C2 | Cyan | C.I. Solvent Blue 70 |
| C3 | Cyan | C.I. Solvent Blue 44 |

Example 5

Thermal data. This example shows the Tg obtained from amorphous solid dye layers formed from some representative dyes. Also illustrated is the melting behavior of the thermal solvent both alone and in the amorphous solid dye matrix. These data confirm that the dye is in a substantially amorphous form, while the thermal solvent is partially dissolved in the dye, and partly in crystalline form.

Thermal transition behavior of samples was determined by Differential Scanning Calorimetry [DSC] using a TA Instruments 2920 DSC unit operated in the Modulated DSC mode [MDSC]. Operation in the MDSC mode enables the total heat flow signal to be separated into reversible and non-reversible heat flow components; permitting the separation of sample phase transitions, such as crystal melting and Tg, from non-reversible phenomena such as volatilization, morphology reorganizations, and chemical reactions. All samples were run in nitrogen atmosphere at heating rates of either 2 or 4 degrees Centigrade/minute over the temperature range: −10° C. to 120° C. [thermal solvents] or −10° C. to 200° C. [dyes]. Samples were run through 2 heating cycles with quench cooling to compare samples after they have a common thermal history. To determine the effect of cooling rate on the sample morphology, samples were run through 3 consecutive heating cycles separated by a slow cool [4° C./min] and quench cool steps. Samples weights were in the range: 4–6 mg.

TABLE III

| Dye | Thermal solvent | Ratio dye:thermal solvent | Tg (° C.) | Melting point (onset/peak, ° C.) | Heat of fusion (J/g) |
|---|---|---|---|---|---|
| Y1 | — | — | 63.3 | —/87.5 | — |
| Y2 | — | — | 56 | >210 | — |
| Y3 | — | — | 118.4 | None - up to degradation | — |
| Y4 | — | — | 180 | None - up to degradation | — |
| M1 | — | — | 122 | None - up to degradation | — |
| M2 | — | — | 85.7 | >200 | — |
| M3 | — | — | 213.7 | None - up to degradation | — |
| C1 | — | — | 99 | None - up to degradation | — |
| C2 | — | — | None detected | None - up to degradation | — |
| C3 | — | — | 160.1 | None - up to degradation | — |
| — | TS1 | — | — | 68.1/73 | 215 |
| — | TS3 | — | — | 84.8/88.7 | 208 |
| — | TS4 | — | — | 87.1/90.9 | 210.7 |
| — | TS5 | — | — | 88/92.7 | 209 |
| — | TS6 | — | — | 61.6/67.5 | 132 |
| — | TS7 | — | — | 78/82 | 134 |
| — | TS8 | — | — | 69/73 | 149 |
| — | TS10 | — | — | 72.5/77.2 | 193 |
| — | TS11 | — | — | 85/90 | 132 |

TABLE III-continued

| Dye | Thermal solvent | Ratio dye:thermal solvent | Tg (° C.) | Melting point (onset/peak, ° C.) | Heat of fusion (J/g) |
|---|---|---|---|---|---|
| — | TS12 | — | — | 89/93 | 117 |
| — | TS13 | — | — | 70.1/90.7 | 162 |
| Y1 | TS1 | 1:1 | — | 61/67 | 100 |
| Y3 | TS3 | 1:1 | — | 57/71 | 49 |
| M2 | TS3 | 1:2 | — | 73/81 | 92 |
| M2 | TS5 | 1:2 | — | 74/87 | 67 |
| M3 | TS3 | 1:1 | — | 59/77 | 71 |
| C2 | TS3 | 4:1 | — | — | 0 |
| C2 | TS3 | 3:2 | — | 61/74 | 56 |
| C2 | TS3 | 1:1 | — | 69/77 | 81 |
| C2 | TS3 | 2:3 | — | 79/83 | 102 |
| C2 | TS3 | 1:4 | — | 82/86 | 164 |

Example 6

This example illustrates the potential loss of a thermal solvent as a function of volatility. Empirically, it has been found that a steady state loss rate of less than 0.001% per minute at 90° C. under the experimental conditions described below is typically preferred.

Thermal solvent candidates were assessed for their relative volatility in a TA Instruments Model 2950 Thermogravometric Analyzer [TGA] by measuring sample weight loss as a function of time while the samples were held @ 90° C. for 3–6 hrs. Sample size was in the range 5–7 mg and all measurements were made in a nitrogen atmosphere. Data were plotted as percent retained of original weight versus time, and the volatility number is reported as the slope of the % weight retained versus time plot when the rate of loss had achieved steady-state. After an initial weight loss (due to the loss of solvent/water as the samples are heated at a rate of 10° C. per minute to the isotherm temperature) a steady state rate of loss was achieved usually within 1–2 hours at the isotherm temperature.

The amount of thermal solvent lost from films stored at elevated temperatures was measured as follows:

a. For TS1.

A coating was prepared containing dye Y3 and thermal solvent TS1 in a 1:1 mass ratio with a coverage of 0.5 gm cm$^{-2}$. The coating was divided into two portions, one of which was stored at room temperature, while the other was heated at 60° C. in an oven for the time indicated in Table X. After heating, each sample (4 in$^2$) was extracted with methyl ethyl ketone (1 mL) and the resultant solution was analyzed by electrospray (+) mass spectrometry. The ratio of thermal solvent found in the sample held at 60° C. to that found in the control sample was reported.

b. For TS3.

A coating was prepared containing dye C2 and thermal solvent TS3 in a 1:1 mass ratio with a coverage of 0.5 gm cm$^{-2}$. The coatings were treated as described in a. above, except that the analysis of the methyl ethyl ketone extracts was performed by gas chromatography.

TABLE IV

| Thermal solvent | Steady State Loss Rate at 90° C. (%/minute) | % remaining in donor film after ( ) hours at 60° C. |
|---|---|---|
| TS1 | 0.0276 | 22(4) |
| TS3 | 0.00083 | 87(120) |
| TS4 | 0.0017 | — |
| TS5 | 0.00054 | — |
| TS6 | 0.0017 | — |
| TS7 | 0.001 | — |
| TS8 | 0.0016 | — |
| TS11 | 0.00045 | — |
| TS12 | 0.0063 | — |
| TS13 | 0.0050 | — |

Example 7

This Example illustrates the significant change in melt viscosity at imaging temperatures which may be achieved by incorporation of a crystalline thermal solvent into an amorphous solid dye. In most cases, the viscosity of the pure amorphous solid dye at imaging temperatures was too high to be reliably measured. However, in one case, that of compound Y1, a measurement was possible at low shear rates. As will be apparent from Table V, a reduction in viscosity of as much as four orders of magnitude is achievable by incorporation of the thermal solvent TS1.

High temperature viscosity measurements were obtained using an AR1000 control stress rheometer supplied by TA instruments, employing a cone and plate geometry. The temperature ramp used was 120–150° C. followed by 150–80° C. or lower (until solidification of the liquid), at a ramp rate of 10° C. per minute. The shear rate used is indicated in Table V.

The final two entries in the Table show that the effect of addition of relatively small amounts of a polymer (poly(2-ethyl-2-oxazoline) Aquazol 50, molecular weight approximately 50,000, available from Polymer Chemistry Innovations, Inc., Tucson, Ariz.) is to greatly increase the melt viscosity of the combination of dye and thermal solvent.

TABLE V

| Dye | Thermal Solvent | Dye:TS mass ratio | Additive (% of dry mass) | Temperature (° C.) | Shear Rate (s$^{-1}$) | Viscosity (Pa s) |
|---|---|---|---|---|---|---|
| — | TS1 | — | — | 100 | 100 | 0.0096 |
| Y1 | TS1 | 1:9 | — | 100 | 50 | 0.0127 |
| Y1 | TS1 | 2:3 | — | 100 | 50 | 0.18 |
| Y1 | TS1 | 1:1 | — | 100 | 50 | 1.21 |
| Y1 | — | 1 | — | 100 | 0.3 | 301 |
| — | TS1 | — | — | 90 | 100 | 0.012 |
| Y3 | TS1 | 3:10 | — | 90 | 100 | 0.022 |
| Y3 | TS1 | 1:1 | — | 90 | 100 | 0.088 |
| Y4 | TS1 | 1:9 | — | 90 | 50 | 0.016 |
| Y4 | TS1 | 1:4 | — | 90 | 50 | 0.024 |
| Y4 | TS1 | 3:7 | — | 90 | 50 | 0.070 |
| Y4 | TS1 | 2:3 | — | 90 | 50 | 0.189 |
| Y4 | TS1 | 1:1 | — | 90 | 50 | 0.642 |
| — | TS3 | — | — | 90 | 100 | 0.004 |
| Y3 | TS3 | 1:2 | — | 90 | 1000 | 0.03 |
| Y3 | TS3 | 1:1 | — | 90 | 100 | 0.089 |
| M3 | TS3 | 1:2 | — | 90 | 100 | 0.061 |
| M3 | TS3 | 1:1 | — | 90 | 100 | 0.278 |
| C2 | TS3 | 1:2 | — | 90 | 1000 | 0.015 |
| C2 | TS3 | 1:1 | — | 90 | 100 | 0.056 |
| C2 | TS3 | 1:2 | Aq 50 (1%) | 90 | 1000 | 0.028 |
| C2 | TS3 | 1:2 | Aq 50 (5%) | 90 | 1000 | 0.061 |

IMAGING EXAMPLES

Donor sheets for thermal transfer in the following imaging examples were prepared in the following manner:

A coating solution was prepared containing the dye (2% w/w) and an appropriate amount of the specified thermal solvent in 1-butanol. This solution was coated onto a poly (ethylene terephthalate) film base of 4.5 micron thickness with a slip coating for thermal printing on the reverse side (supplied by International Imaging Materials, Inc., Amherst, N.Y.) using a #7 Meyer rod, and the coating was dried using warm air. After standing for one hour, the resulting donor element was placed over a receiver sheet, with the coated side in contact with the microporous receiver coating. Unless otherwise stated, the receiver sheet was Photo IJ Paper QP ink jet paper, available from Konica. The resulting assembly was printed using a laboratory test-bed printer equipped with a thermal head supplied by Kyocera Corporation, Kyoto, Japan. The following printing parameters were used:

| | |
|---|---|
| Printhead width: | 4 inch |
| Resistor size: | 70 × 70 microns |
| Resistance: | 1124 Ohm |
| Voltage: | 11 V |
| Print speed: | 1.67 inches/second (2 msec per line) |
| Pressure: | 1.5–2 lb/linear inch |
| Donor peeling: | 90 degree angle, 0.1–0.2 seconds after printing |
| Dot pattern: | Odd-numbered and even-numbered pixels printed alternately in successive lines; one pixel (70 micron) spacing between lines in paper transport direction. Ten steps of different energy were printed, the current pulse for a given pixel in each step varying between 0.2–2 msec per line. |

Following printing, the reflection density in each of the ten printed areas was measured using a spectrophotometer supplied by GretagMacbeth Corporation, and this density was plotted against the energy supplied to the thermal head.

From these graphs, the following four parameters were extracted: $D_{min}$, $D_{max}$, Energy to reach a density of $D_{max}/2$ (E0.5) and slope at $E_{0.5}$ (Slope) In the examples below $D_{min}$, $E_{0.5}$ and slope are reported. $D_{min}$ was that of the receiver sheet used.

Example 8

Imaging of pure amorphous solid dyes in accordance with the single phase embodiment of the invention. This example shows that in the specified cases, an image was obtained by thermal transfer of a pure amorphous solid dye, without any other additives. In this way, the thinnest possible donor layer for transfer of a given dye may be obtained. It can be seen that some dyes, for example, M2, M3 and C1, do not provide an image in the absence of a thermal solvent.

TABLE VI

| Dye | Thermal solvent | Approximate donor coating thickness (microns) | $D_{max}$ | $E_{05}$ (J/cm$^2$) | Slope (cm$^2$/J) |
|---|---|---|---|---|---|
| Y1 | — | 0.25 | 0.92 | 1.21 | 1.79 |
| Y2 | — | 0.25 | 0.33 | 1.21 | 2.08 |
| Y3 | — | 0.25 | 0.17 | 1.32 | — |
| M1 | — | 0.25 | 0.78 | 1.04 | 2.00 |
| M2 | — | 0.5 | None | n/a | n/a |
| M3 | — | 0.5 | None | n/a | n/a |
| C1 | — | 0.5 | None | n/a | n/a |
| C2 | — | 0.5 | 0.24 | 0.88 | 0.22 |

Example 9

Imaging of representative dyes with various thermal solvents. In this example, the use of various thermal solvents with a model dye which as seen in Example 8 did not by itself transfer efficiently under the test conditions is illustrated. By comparison with Example 8, it can be seen that the energy for transfer of dye M2 in the presence of a thermal solvent is substantially lower than any of the tested pure amorphous solid dyes in the absence of thermal solvent.

TABLE VII

| Dye | Thermal solvent (mass ratio w.r.t dye) | Approximate donor coating thickness (microns) | $D_{max}$ | $E_{05}$ (J/cm$^2$) | Slope (cm$^2$/J) |
|---|---|---|---|---|---|
| M2 | TS1 (1) | 0.5 | 1.22 | 0.63 | 1.56 |
| M2 | TS2 (1) | 0.5 | 1.85 | 0.63 | 2.26 |
| M2 | TS3 (1) | 0.5 | 1.79 | 0.81 | 1.78 |
| M2 | TS4 (1) | 0.5 | 1.91 | 0.82 | 1.89 |
| M2 | TS5 (1) | 0.5 | 1.94 | 0.72 | 2.29 |
| M2 | TS6 (1) | 0.5 | 2.00 | 0.77 | 1.12 |
| M2 | TS7 (1) | 0.5 | 1.82 | 0.68 | 2.54 |
| M2 | TS8 (1) | 0.5 | 1.84 | 0.53 | 2.86 |
| M2 | TS9 (1) | 0.5 | 1.99 | 0.62 | 2.77 |
| M2 | TS10 (1) | 0.5 | 2.05 | 0.52 | 2.82 |

Example 10

Imaging of various dyes with TS1. This example illustrates the imaging of a wide variety of dyes using an α,ω-diol thermal solvent.

TABLE VIII

| Dye | Thermal solvent (mass ratio w.r.t dye) | Approximate donor coating thickness (microns) | $D_{max}$ | $E_{05}$ (J/cm$^2$) | Slope (cm$^2$/J) |
|---|---|---|---|---|---|
| Y1 | TS1 (1) | 0.5 | 1.19 | 0.63 | 2.71 |
| Y3 | TS1 (1) | 0.5 | 1.17 | 0.65 | 2.57 |
| M1 | TS1 (1) | 0.5 | 1.03 | 0.55 | 2.39 |
| M2 | TS1 (1) | 0.5 | 1.22 | 0.63 | 1.56 |
| M3 | TS1 (1) | 0.5 | 1.60 | 0.85 | 1.21 |
| C1 | TS1 (1) | 0.5 | 0.97 | 0.71 | 1.51 |
| C2 | TS1 (1) | 0.5 | 1.07 | 0.54 | 1.50 |

Example 11

Imaging of various dyes with TS3. This example illustrates the imaging of a wide variety of dyes using an α,ω-bisamide thermal solvent.

TABLE IX

| Dye | Thermal solvent (mass ratio w.r.t. dye) | Approximate donor coating thickness (microns) | $D_{max}$ | $E_{0.5}$ (J/cm$^2$) | Slope (cm$^2$/J) |
|---|---|---|---|---|---|
| Y1 | TS3 (1) | 0.5 | Donor film was tacky | | |
| Y3 | TS3 (1) | 0.5 | 1.18 | 0.65 | 2.42 |
| M1 | TS3 (l) | 0.5 | Donor film was tacky | | |
| M2 | TS3 (1) | 0.5 | 1.79 | 0.81 | 1.78 |
| M3 | TS3 (1) | 0.5 | 1.71 | 0.97 | 1.08 |
| C1 | TS3 (1) | 0.5 | Donor film was tacky | | |
| C2 | TS3 (1) | 0.5 | 1.03 | 0.65 | 2.06 |

Example 12

Imaging of a donor with differing ratios of dye: thermal solvent. As illustrated in Example 7 above, the ratio of thermal solvent to dye has a significant influence on the melt viscosity of the mixture at imaging temperatures. In this example, the effect upon imaging performance of changing the ratio of dye to thermal solvent is illustrated. For best performance, a ratio of about 1:2 dye:thermal solvent is indicated.

TABLE X

| Dye | Thermal solvent (mass ratio w.r.t. dye) | Approximate donor coating thickness (microns) | $D_{max}$ | $E_{0.5}$ (J/cm$^2$) | Slope (cm$^2$/J) |
|---|---|---|---|---|---|
| C2 | TS3 (0.25) | 0.3 | 0.63 | 1.21 | 0.87 |
| C2 | TS3 (1) | 0.5 | 1.03 | 0.65 | 2.06 |
| C2 | TS3 (2) | 0.75 | 1.18 | 0.62 | 2.73 |
| C2 | TS3 (3) | 1.0 | 1.17 | 0.63 | 2.78 |
| M3 | TS3 (1) | 0.5 | 1.71 | 0.97 | 1.08 |
| M3 | TS3 (2) | 0.75 | 1.58 | 0.77 | 1.92 |
| M3 | TS3 (3) | 1.0 | 1.66 | 0.74 | 1.75 |

Example 13

Variable density imaging. In this example, TS12 refers to 1-hexadecanol and TS13 refers to 1-octadecanol. The donor coatings were prepared in the same manner as described above, except that a small amount of surfactant was added (FC-431, available from 3M), amounting to 0.3% of the dry weight of the coating for the first two table entries and 0.6% of the dry weight of the coating for the final two table entries. The receiver sheet used was Epson Glossy Film paper for inkjet printing, available from Seiko Epson Corporation. The donor/receiver combination was printed using a laboratory test-bed printer equipped with a thermal head supplied by Kyocera Corporation, Kyoto, Japan. The following printing parameters were used:

| | |
|---|---|
| Printhead width: | 4 inch |
| Resistor size: | 70 × 140 microns |
| Resistance: | 3750 Ohm |
| Voltage: | 9.5 V |
| Print speed: | 5 inches/second (6 msec per line) |
| Pressure: | 1.5–2 lb/linear inch |
| Donor peeling: | 90 degree angle, 0.1–0.2 seconds after printing |
| Dot pattern: | All pixels were used in each line, such that a rectangular grid was printed. Sixteen steps of different energy per pixel were printed, using a pulse pattern optimized for dye diffusion thermal transfer (continuous tone) printing. |

Following printing, the reflection density in each of the sixteen printed areas was measured using a spectrophotometer supplied by GretagMacbeth Corporation, and this density was plotted against the energy supplied to the thermal head. From these graphs, the following four parameters were extracted: $D_{min}$, $D_{max}$, Energy to reach a density of $D_{max}/2$ ($E_{0.5}$) and slope at $E_{0.5}$ (Slope).

It can be seen from the final column of the table that incorporation of the second thermal solvent (in these cases a poor solvent for the dye) causes a marked decrease in the slope of the curve relating input energy to density achieved (i.e., an improvement in continuous tone performance) over the case where only one thermal solvent was used (first row).

TABLE XI

| Dye | Thermal solvent 1 (mass ratio w.r.t dye) | Thermal solvent 2 (mass ratio w.r.t dye) | Approximate donor coating thickness (microns) | $D_{max}$ | $E_{0.5}$ (J/cm$^2$) | Slope (cm$^2$/J) |
|---|---|---|---|---|---|---|
| M2 | TS3 (0.5) | — | 0.4 | 1.13 | 0.96 | 6.14 |
| M2 | TS3 (0.125) | TS12 (0.5) | 0.4 | 1.37 | 0.51 | 2.61 |

TABLE XI-continued

| Dye | Thermal solvent 1 (mass ratio w.r.t dye) | Thermal solvent 2 (mass ratio w.r.t. dye) | Approximate donor coating thickness (microns) | $D_{max}$ | $E_{0.5}$ (J/cm$^2$) | Slope (cm$^2$/J) |
|---|---|---|---|---|---|---|
| M2 | TS3 (0.5) | TS13 (0.125) | 0.4 | 1.45 | 0.81 | 3.61 |
| C2 | TS3 (0.5) | TS13 (0.125) | 0.4 | 0.64 | 0.87 | 3.2 |

Example 14

The example illustrates a three color printing method according to the invention.

Three donor sheets were prepared as follows:

Three coating solutions containing the dyes and thermal solvents specified in Table XII in 1-butanol were separately applied onto poly(ethylene terephthalate) film base of 4.5 micron thickness with a slip coating for thermal printing on the reverse side (supplied by International Imaging Materials, Amherst, NY) to give dried coatings whose coverage is indicated in Table XII. Separately, the melt viscosity for the three mixtures of dye and thermal solvent were measured as described in Example 7. These viscosities are included in Table XII.

TABLE XII

| Color | Dye | Thermal Solvent (mass ratio w.r.t. dye) | Donor Coating Coverage (g/m2) | Donor Viscosity (90° C., PaS) |
|---|---|---|---|---|
| Yellow | Y3 | TS12 (2) | 0.61 | 0.091 |
| Magenta | M4 | TS13 (3) | 0.55 | 0.062 |
| Cyan | C2 | TS11 (1.67) | 0.78 | 0.15 |

The resulting donor element was placed over a receiver sheet (Photo IJ Paper QP ink jet paper, available from Konica Corporation) with the coated side of the donor in contact with the microporous receiver coating. The resulting assembly was printed using a laboratory test-bed printer equipped with a thermal head supplied by Kyocera Corporation, Kyoto, Japan. The following parameters were used:

| | |
|---|---|
| Printhead width: | 4 inch |
| Resistor size: | 70 × 70 microns |
| Resistor spacing: | 300 dpi |
| Resistance: | 3690 Ohms |
| Voltage: | 19.3 V |
| Print speed: | 1.66 inches/second |
| Pressure: | 1.5 lb/linear inch |
| Donor peeling: | 90 degree angle, 0.2 seconds after printing |
| Dot pattern: | Odd-numbered and even-numbered pixels printed alternately in successive lines; 68 micron spacing between lines in paper transport direction. A continuous gray scale was printed in each color and in black, the current pulse for a given pixel varying between 0–1 msec per line. |
| Color printing: | The print order was magenta, then yellow, then cyan. Between passes, the receiver sheet was maintained in registration by the drive rollers. |

Following printing, the Dmax density for yellow, magenta, cyan and black was measured using a spectrophotometer supplied by GretagMecbeth Corporation with Status A filtration. Each gray scale wedge was scanned using a PowerLook III scanner, available from Umax Corporation, Hsinchu, Taiwan, and the scanner densities were scaled to Status A. This density was plotted against the energy supplied to the thermal print head, and from these graphs, the energy to reach a density of Dmax/2 ($E_{0.5}$) and the slope at $E_{0.5}$ (Slope) were estimated. Table XIII summarizes the results:

TABLE XIII

| Color | Dmax | $E_{0.5}$ (J/cm$^2$) | Slope (cm$^2$/J) |
|---|---|---|---|
| Yellow | 1.53 | 0.764 | 2.19 |
| Magenta | 1.59 | 0.793 | 2.05 |
| Cyan | 1.72 | 0.759 | 1.85 |
| Black | 1.72 | 0.777 | 1.95 |

From Table XIII, it can be seen that each separate primary color, and the combination of all three primary colors (making the black image) were able to be printed with approximately the same energy to give acceptable print densities. As indicated in Table XII, the print order used was in the inverse order of melt viscosities of the donor materials. If printing were carried out in any other order, the durability and quality of the images so obtained were inferior to those of the image reported here.

Although the invention has been described with respect to specific preferred embodiments it is not intended to be limited thereto but rather those skilled in the art will recognize that these are illustrative only and that modifications and variations may be made therein which are within the spirit of the invention and the scope of the appended claims.

What is claimed is:

1. A thermal mass transfer imaging method comprising heating a donor element which comprises a substrate carrying a thermal transfer material layer comprising a dye-containing, amorphous phase comprising at least one dye, wherein said dye forms a continuous film, and at least one thermal solvent having a melting point above about 50° C., at least a portion of said thermal solvent forming a separate crystalline phase and wherein said crystalline thermal solvent is capable upon melting of causing said dye in said dye-containing phase to transfer to said receiver layer at a temperature lower than that at which said transfer could be effected in the absence of said crystalline thermal solvent, and imagewise transferring portions of the transfer material layer to a receiver layer.

2. The thermal imaging method as defined in claim 1 wherein said thermal transfer material layer includes two different thermal solvents having different melting points, said thermal solvent having a lower melting point causing less dye to transfer than said thermal solvent having a higher melting point.

3. The thermal imaging method as defined in claim 1 wherein said thermal solvent has a melting point in the range of from about 60° C. to about 120° C.

4. The thermal imaging method as defined in claim 1 wherein said thermal solvent has a melting point of about 90° C.

5. The thermal imaging method as defined in claim 1 wherein said thermal solvent is present in an amount of from about 1:3 to about 3:1 by weight of said dye in said dye-containing phase.

6. The thermal imaging method as defined in claim 1 wherein said thermal solvent is selected from the group consisting of alkanols containing at least about 12 carbon atoms, alkanediols containing at least about 12 carbon atoms, esters and amides of mono- and dicarboxylic acids containing at least about 12 carbon atoms, aryl sulfonamides and hydroxyalkyl-substituted arenes.

7. The thermal imaging method as defined in claim 1 wherein said thermal solvent is selected from the group consisting of:

1,10-decanediol; 1,12-dodecanediol; 1,12-dodecanedioic acid, bis(dimethyl amide); 1,14-tetradecanedioic acid, bis(dimethyl amide); 1,16-hexadecanedioic acid, bis (dimethyl amide); n-hexadecan-1-yl acetamide; n-decan-1-yl-4-methoxybenzamide; n-decan-1-yl-4-chlorobenzamide; n-(dodecan-1-yl-aminocarbonyl) morpholine; dodecan-1-yl-nicotinamide; n-decan-1-yl-4-nitrobenzamide; carbamic acid, 1,4-butanediyl-bis-diethyl ester; and n-dodecyl-4-methoxybenzamide.

8. The thermal imaging method as defined in claim 1 wherein said receiver layer is microporous and has an average pore size not greater than about 1 $\mu$m and wherein the viscosity of said thermal transfer material at the melting point of said crystalline thermal solvent is sufficiently low to allow substantially all said thermal transfer material transferred to said receiver layer to enter said pores.

9. The thermal imaging method as defined in claim 1 wherein said thermal transfer material layer has a thickness not greater than about 2 $\mu$m.

10. The thermal imaging method as defined in claim 9 wherein said thermal transfer layer has a thickness not greater than about 1 $\mu$m.

11. The thermal imaging method as defined in claim 1 wherein said receiver layer is microporous and has an average pore size not greater than about 1 $\mu$m.

12. The thermal imaging method as defined in claim 11 wherein said receiver layer has an average pore size not greater than about 0.5 $\mu$m.

13. The thermal imaging method as defined in claim 1 wherein at least one of said thermal transfer material layer or a layer in thermal contact therewith comprises a radiation-absorbing material and heating of said thermal transfer material layer is effected by imagewise exposure of the layer(s) containing said radiation-absorbing material to radiation absorbed by said radiation-absorbing material.

14. The thermal imaging method as defined in claim 1 wherein said dye-containing phase of said thermal transfer material layer has a glass transition temperature greater than about 60° C.

15. A multicolor thermal mass transfer imaging method comprising heating in succession at least two donor elements, each of said donor elements comprising a substrate carrying a thermal transfer material layer comprising a dye-containing amorphous phase comprising at least one dye, wherein said dye of each said donor element forms a continuous film, and at least one thermal solvent having a melting point above about 50° C., at least a portion of said thermal solvent forming a separate crystalline phase and wherein said crystalline thermal solvent is capable upon melting of causing said dye in said dye-containing phase to transfer to said receiver layer at a temperature lower than that at which said transfer could be effected in the absence of said crystalline thermal solvent, and wherein the thermal transfer material layer of each said donor element is a different color, and successively imagewise transferring, in registration, portions of the transfer material layer of each said donor element to a receiver element whereby a multicolor image is formed.

16. The multicolor thermal mass transfer imaging method as defined in claim 15 wherein at least three donor elements are heated in succession, the thermal transfer material layer of each said three donor elements being cyan-, magenta- and yellow-colored, respectively.

17. The multicolor thermal mass transfer imaging method as defined in claim 16 wherein the thermal transfer material of each said donor has a different melt viscosity and wherein portions of the transfer material layer of each said donor element are transferred successively imagewise to a receiver element in inverse order of said viscosity.

18. A donor element for use in thermal transfer imaging, said donor element comprising a substrate carrying a solid thermal transfer material layer comprising a dye-containing amorphous phase comprising at least one dye, wherein said dye forms a continuous film, and at least one thermal solvent having a melting point above about 50° C., at least a portion of said thermal solvent forming a separate crystalline phase and wherein upon melting said crystalline thermal solvent is capable of causing said dye in said dye-containing phase to transfer to a receiver layer at a temperature lower than that at which such transfer could be effected in the absence of said crystalline thermal solvent.

19. The donor element as defined in claim 18 wherein said thermal transfer material layer has a thickness not greater than about 2 $\mu$m.

20. The donor element as defined in claim 19 wherein said thermal transfer material layer has a thickness not greater than about 1 $\mu$m.

21. The donor element as defined in claim 18 wherein said dye-containing phase of said thermal transfer material layer has a glass transition temperature greater than about 60° C.

22. The donor element as defined in claim 18 wherein said thermal transfer material layer includes two different thermal solvents having different melting points.

23. The donor element as defined in claim 18 wherein said thermal solvent has a melting point in the range of from about 60° C. to about 120° C.

24. The donor element as defined in claim 18 wherein said thermal solvent has a melting point in the range of from about 65° C. to about 100° C.

25. The donor element as defined in claim 18 wherein said thermal solvent is present in an amount of from about 1:3 to about 3:1 by weight of said dye in said dye-containing phase.

26. The donor element as defined in claim 18 wherein said thermal solvent is selected from the group consisting of alkanols containing at least about 12 carbon atoms, alkanediols containing at least about 12 carbon atoms, esters and amides of mono- and dicarboxylic acids containing at least about 12 carbon atoms, aryl sulfonamides and hydroxyalkyl-substituted arenes.

27. The donor element as defined in claim 18 wherein said thermal solvent is selected from the group consisting of:

1,10-decanediol; 1,12-dodecanediol; 1,12-dodecanedioic acid, bis(dimethyl amide); 1,14-tetradecanedioic acid, bis(dimethyl amide); 1,16-hexadecanedioic acid, bis (dimethyl amide); n-hexadecan-1-yl acetamide; n-decan-1-yl-4-methoxybenzamide; n-decan-1-yl-4-chlorobenzamide; n-(dodecan-1-yl-aminocarbonyl) morpholine; dodecan-1-yl-nicotinamide; n-decan-1-yl-4-nitrobenzamide; carbamic acid, 1,4-butanediyl-bis-diethyl ester; and n-dodecyl-4-methoxybenzamide.

28. A fusible composition comprising an amorphous dye-containing phase and at least one thermal solvent having a melting point above about 50° C., at least a portion of which forms a crystalline phase separate from the amorphous dye-containing phase, said thermal solvent capable of causing said dye-containing phase to liquefy thereby causing said diffusible composition to liquefy at a temperature lower than such liquefaction could occur in the absence of said thermal solvent.

29. A thermal mass transfer imaging method comprising:
heating a donor element which comprises a substrate carrying a thermal transfer material layer comprising a dye-containing, amorphous phase comprising at least one dye non-covalently bonded to a non-dye component, wherein said dye forms a continuous film, and
imagewise transferring portions of the transfer material layer to a receiver layer.

30. The thermal imaging method as defined in claim 29 wherein one of said dye and said non-dye component includes a plurality of acidic groups and the other of said dye and non-dye component includes a plurality of basic groups.

31. The thermal imaging method as defined in claim 29 wherein said non-dye component is 1,3-di(4-pyridyl) propane.

32. The thermal imaging method as defined in claim 29 wherein said thermal transfer material layer further includes at least one thermal solvent having a melting point above about 50° C., at least a portion of said thermal solvent forming a separate crystalline phase and wherein said crystalline thermal solvent is capable upon melting of causing said dye in said dye-containing phase to transfer to said receiver layer at a temperature lower than that at which said transfer could be effected in the absence of said crystalline thermal solvent.

33. The thermal imaging method as defined in claim 32 wherein said thermal solvent has a melting point in the range of from about 60° C. to about 120° C.

34. The thermal imaging method as defined in claim 32 wherein said thermal solvent is present in an amount of from about 1:3 to about 3:1 by weight of said dye in said dye-containing phase.

35. The thermal imaging method as defined in claim 29 wherein said thermal transfer material layer has a thickness not greater than about 2 μm.

36. A donor element for use in thermal transfer imaging, said donor element comprising a substitute carrying a solid thermal transfer material layer comprising a dye-containing amorphous phase comprising at least one dye non-covalently bonded to a non-dye component, wherein said dye forms a continuous film.

37. The donor element as defined in claim 36 wherein one of said dye and said non-dye component includes a plurality of acidic groups and the other of said dye and said non-dye component includes a plurality of basic groups.

38. The donor element as defined in claim 36 wherein said non-dye component is 1,3-di (4-pyridyl) propane.

39. The donor element as defined in claim 36 wherein said thermal transfer material layer further includes at least one thermal solvent having a melting point above about 50° C.

40. The donor element as defined in claim 39 wherein said thermal solvent has a melting point in the range of from about 60° C. to about 120° C.

41. The donor element as defined in claim 39 wherein said thermal solvent is present in an amount of from about 1:3 to about 3:1 by weight of said dye in said due-containing phase.

42. The donor element as defined in claim 36 wherein said thermal transfer material layer has a thickness not greater than about 2 μm.

43. A thermal mass transfer imaging method comprising:
heating a donor element which comprises a substrate carrying a thermal transfer material layer comprising a dye-containing, amorphous phase comprising at least one dye, wherein said dye forms a continuous film and wherein not more than about 5 percent by weight of the material in said thermal transfer material layer has a molecular weight higher than that of the dye of the highest molecular weight in the dye-containing phase, and
imagewise transferring portions of the transfer material layer to a receiver layer.

44. The thermal imaging method as defined in claim 43 wherein said thermal transfer material layer further includes at least one thermal solvent having a melting point above about 50° C., at least a portion of said thermal solvent forming a separate crystalline phase and wherein said crystalline thermal solvent is capable upon melting of causing said dye in said dye-containing phase to transfer to said receiver layer at a temperature lower than that at which said transfer could be effected in the absence of said crystalline thermal solvent.

45. The thermal imaging method as defined in claim 44 wherein said thermal solvent has a melting point in the range of from about 60° C. to about 120° C.

46. The thermal imaging method as defined in claim 44 where in said thermal solvent is present in an amount of from about 1:3 to about 3:1 by weight of said dye in said dye-containing phase.

47. The thermal imaging method as defined in claim 43 wherein said thermal transfer material layer has a thickness not greater than about 2 μm.

48. The thermal imaging method as defined in claim 43 wherein not more than about 2 percent by weight of the material in said thermal transfer material layer has a molecular weight higher than that of the dye of the highest molecular weight in the dye-containing phase.

49. The thermal imaging method as defined in claim 43 wherein not more than about 1 percent by weight of the material in said thermal transfer material layer has a molecular weight higher than that of the dye of the highest molecular weight in the dye-containing phase.

50. A donor element for use in thermal transfer imaging, said donor element comprising a substrate carrying a solid thermal transfer material layer comprising a dye-containing amorphous phase comprising at least one dye, wherein said dye forms a continuous film and wherein not more than about 5 percent by weight of the material in said thermal transfer material layer has a molecular weight higher than that of the highest molecular weight dye in the dye-containing phase.

51. The donor element as defined in claim 50 wherein said thermal transfer material layer further includes at least one thermal solvent having a melting point above about 50° C.

52. The donor element as defined in claim 51 wherein said thermal solvent has a melting point in the range of from about 60° C. to about 120° C.

53. The donor element as defined in claim 51 wherein said thermal transfer material layer includes two different thermal solvents having different melting points.

54. The donor element as defined in claim 51 wherein said thermal solvent is present in an amount of from about 1:3 to about 3:1 by weight of said dye in said dye-containing phase.

55. The donor element as defined in claim 50 wherein said thermal transfer material layer has a thickness not greater than about 2 μm.

* * * * *